US012049394B2

(12) United States Patent
Yoo et al.

(10) Patent No.: US 12,049,394 B2
(45) Date of Patent: Jul. 30, 2024

(54) MULTI-STEP HEIGHT ADJUSTER

(71) Applicant: Samhongsa Co., Ltd., Seoul (KR)

(72) Inventors: Won Jun Yoo, Paju-si (KR); Wan Soo Kim, Bucheon-si (KR)

(73) Assignee: Samhongsa Co., Ltd., Seoul (KR)

( * ) Notice: Subject to any disclaimer, the term of this patent is extended or adjusted under 35 U.S.C. 154(b) by 632 days.

(21) Appl. No.: 17/271,786

(22) PCT Filed: Aug. 30, 2019

(86) PCT No.: PCT/KR2019/011157
§ 371 (c)(1),
(2) Date: Feb. 26, 2021

(87) PCT Pub. No.: WO2020/046043
PCT Pub. Date: Mar. 5, 2020

(65) Prior Publication Data
US 2021/0339990 A1 Nov. 4, 2021

(30) Foreign Application Priority Data

Aug. 31, 2018 (KR) .......................... 10-2018-0104043

(51) Int. Cl.
*B66F 3/28* (2006.01)
*A47B 9/04* (2006.01)
(Continued)

(52) U.S. Cl.
CPC .................. *B66F 3/28* (2013.01); *A47B 9/04* (2013.01); *A47B 9/10* (2013.01); *A47B 21/02* (2013.01);
(Continued)

(58) Field of Classification Search
CPC ..... A47C 3/30; A47C 3/24; B66F 3/28; B66F 3/247; A47B 9/04; A47B 21/02; A47B 9/10; F16F 9/0209; F16F 9/3257
See application file for complete search history.

(56) References Cited

U.S. PATENT DOCUMENTS 6,199,806 B1 * 3/2001 Sauer ...................... A47B 9/10
248/404
2010/0231020 A1 * 9/2010 Kim ......................... A47C 3/30
297/344.19

FOREIGN PATENT DOCUMENTS

JP 2001-330007 A 11/2001
KR 20-2000-0014564 U 7/2000
(Continued)

OTHER PUBLICATIONS

Translation of the description of Japanese Patent No. JP 2001330007 (3 pages) obtained from PE2E database on Nov. 7, 2023.*
(Continued)

*Primary Examiner* — Pamela Rodriguez
(74) *Attorney, Agent, or Firm* — Kilpatrick Townsend & Stockton LLP

(57) ABSTRACT

According to an aspect of the present disclosure, a multi-step height adjuster includes a base tube portion including a first base tube and a second base tube vertically reciprocating inside the first base tube; a spindle portion including a first spindle installed inside the first base tube to vertically reciprocate and a second spindle installed inside the second base tube to vertically reciprocate; and an adjustment portion installed in the spindle portion to transmit power to the spindle portion, wherein the first spindle and the second base tube are integrally moved.

13 Claims, 23 Drawing Sheets

(51) Int. Cl.
    *A47B 9/10*         (2006.01)
    *A47B 21/02*       (2006.01)
    *A47C 3/24*         (2006.01)
    *A47C 3/30*         (2006.01)
    *B66F 3/24*         (2006.01)
    *F16F 9/02*         (2006.01)
    *F16F 9/32*         (2006.01)

(52) U.S. Cl.
    CPC .................. *A47C 3/24* (2013.01); *A47C 3/30* (2013.01); *B66F 3/247* (2013.01); *F16F 9/0209* (2013.01); *F16F 9/3257* (2013.01)

(56) References Cited

FOREIGN PATENT DOCUMENTS

| KR | 20-2000-0014565 U | 7/2000 |
|---|---|---|
| KR | 10-2012-0085490 A | 8/2012 |
| KR | 10-2017-0104869 A | 9/2017 |

OTHER PUBLICATIONS

Korean Patent No. KR 20000008481 to Chun published on Feb. 7, 2000.*
Korean Patent No. KR 20150069569 to An et al. published on Jun. 23, 2015.*
Korean Patent No. KR 20150110125 to Kim published on Oct. 2, 2015.*
WO document No. WO 2016114596 to Park published on Jul. 21, 2016.*
Korean Patent No. KR 20160115583 to An published on Oct. 6, 2016.*
European Patent No. EP 3245899 to Park published on Apr. 8, 2021.*
International Search Report and Written Opinion for PCT/KR2019/011157 mailed Dec. 16, 2019, all pages.
Office Action for Chinese Patent Application No. 201980056381.6 mailed Feb. 2, 2024 (with English translation), 14 pages.

* cited by examiner

PRIOR ART

PRIOR ART

MULTI-STEP HEIGHT ADJUSTER

TECHNICAL FIELD

Embodiments of the present disclosure relate to a multi-step height adjuster.

BACKGROUND ART

In general, gas cylinders used in multi-step height adjusters of seats and so on include base tubes and gas spindles, and the gas spindles of the gas cylinders are vertically moved to adjust heights of the seats.

FIG. 18 is a cross-sectional view schematically illustrating a structure of a gas cylinder of the related art. Referring to FIG. 18, a gas cylinder 1000 of the related art includes a spindle 1300 connected to a lower surface of a seat, a base tube 1100 that supports the spindle 1300, and a tube guide 1200 inserted between the base tube 1100 and the spindle 1300 so that the spindle 1300 may not incline left and right when the spindle 1300 is raised or lowered.

In detail, the gas cylinder 1000 includes a piston 2300 which relatively vertically reciprocates inside the spindle 1300, a piston rod 2200 on which the piston 2300 is mounted, and a cylinder 1600 inserted into an inner circumferential surface of the spindle 1300 to be in surface-contact with an O-ring mounted on an outer circumferential surface of the piston 2300. Here, the cylinder 1600 includes an upper chamber 2000 and a lower chamber 2100 divided by the piston 2300.

In addition, the gas cylinder 1000 includes a gas sealing portion 2400 sealing that seals a lower end portion of the cylinder 1600, a pipe holder 1700 that seals an upper end portion of the cylinder 1600, an opening/closing pin 1500 inserted through a central portion of the pipe holder 1700, and an open pin 1400 for controlling opening and closing of the opening/closing pin 1500 by a vertical motion.

In detail, an orifice 1800 is formed on one side of the pipe holder 1700 that gas enters and exits, and the orifice 1800 is opened and closed by the opening/closing pin 1500. In addition, a gas flow path 1900 through which nitrogen gas discharged through the orifice 1800 moves is formed between the cylinder 1600 and the spindle 1300.

Hereinafter, functions of the gas cylinder 1000 of the related art constituting the above configuration will be described, and a process in which a user sits on a seat will be described as an example.

First, when a user sits on a seat and raises or lowers an operation lever (not illustrated) connected to the open pin 1400, the open pin 1400 is pressed. In addition, when the open pin 1400 is pressed downward, the opening/closing pin 1500 is lowered. In addition, when the opening/closing pin 1500 is lowered, gas stored in the upper chamber 2000 is moved to the orifice 1800 along a side surface of the opening/closing pin 1500. The gas moved to the orifice 1800 is moved to the lower chamber 2100 through the gas flow path 1900. Then, a volume of the lower chamber 2100 becomes larger than a volume of the upper chamber 2000 to cause the spindle 1300 to be lowered. In addition, when a user removes a force applied to the operation lever, gas no longer moves. Thus, the seat is fixed at a height desired by the user.

Gas cylinders of the related art that adjust a height are mainly used in seats and have a limited stroke which is a stroke distance, and the gas cylinders have a problem in that there is a limitation in raising an upper plate by applying a short stroke to a table, a work stand, and a dining table, or a desk, a chair, etc. that may be adjusted in height.

The above-described background technology is technical information possessed by the inventor for derivation of the present disclosure or acquired during a derivation process of the present disclosure and is not necessarily a known technology disclosed to people prior to filing of the present disclosure.

DESCRIPTION OF EMBODIMENTS

Technical Problem

An object of embodiments according to the present disclosure is to provide a multi-step height adjuster capable of increasing a stroke during extension by independently extending or reducing two or more adjustment portions.

Solution to Problem

According to an aspect of the present disclosure, a multi-step height adjuster includes a base tube portion including a first base tube and a second base tube vertically reciprocating inside the first base tube; a spindle portion including a first spindle installed inside the first base tube to vertically reciprocate and a second spindle installed inside the second base tube to vertically reciprocate; and an adjustment portion installed in the spindle portion to transmit power to the spindle portion, wherein the first spindle and the second base tube are integrally moved.

In addition, an outer shape of the first base tube may be one of a circular shape, a polygonal shape, and a streamlined shape.

In addition, the spindle portion may be formed in one of a circular shape, a polygonal shape, and a streamlined shape.

In addition, one side of the spindle portion may be cut to form a cut surface.

In addition, an outer circumferential surface of the first spindle and an outer circumferential surface of the second base tube may be coupled to each other by welding.

In addition, the adjustment portion installed in the spindle portion may be any one of a gas cylinder or a gas spring.

In addition, the gas cylinder may include a piston rod inserted into the base tube portion; a piston assembly coupled to the piston rod to relatively move inside the spindle portion; and a cylinder inserted into the spindle portion to be in surface-contact with the piston assembly.

In addition, the gas spring may include a hollow cylinder installed in the spindle portion; a piston assembly vertically reciprocating inside the cylinder; a spacer arranged inside the cylinder to limit movement of the piston assembly; a gas sealing member arranged inside the cylinder to be in contact with the spacer; a flange in contact with the gas sealing member to block an inlet portion of the cylinder; and a cured film arranged between the spacer and the gas sealing member or between the gas sealing member and the flange to cure a liquid sealing agent to close a gas outflow path.

In addition, the multi-step height adjuster may further include an opening/closing pin portion including a first opening/closing pin coupled to one of the first spindle and the first base tube to open and close a gas flow path into the first spindle, and a second opening/closing pin coupled to the second spindle to open and close a gas flow path into the second spindle; and a controller for controlling movement of the opening/closing pin portion.

In addition, the controller may include a release arm arranged to be in contact with one end portion of the opening/closing pin portion to control opening and closing of the opening/closing pin portion; and a tapered holder configured to accommodate the release arm and arranged inside the spindle portion and in contact with the release arm to support the release arm.

In addition, the multi-step height adjuster may further include a rotation guide member arranged between the tapered holder and the spindle portion to guide rotation of the release arm so that the release arm is rotatable about a longitudinal central axis of the opening/closing pin portion.

In addition, the controller may include a stick portion connected to one end portion of the opening/closing pin portion and rotatably arranged at the center of the spindle portion to control opening and closing of the opening/closing pin portion; and a tapered holder configured to accommodating the stick portion and arranged inside the spindle portion.

In addition, the multi-step height adjuster may further include a spindle guide portion inserted into the first base tube to be coupled to the first base tube and arranged outside the first spindle and the second base tube to guide elevation paths of the first spindle and the second base tube.

Other aspects, characteristics, and advantages other than those described above will become apparent from the following drawings, claims, and detailed description of the disclosure.

Advantageous Effects of Disclosure

Embodiments of the present disclosure may obtain an effect of increasing a stroke when a height is extended by independently adjusting a length using a plurality of adjustment portions.

In addition, because a plurality of base tubes and a plurality of spindles are formed, a relatively greater stroke than a stroke of a single base tube and a stroke of a single spindle may be obtained.

The scope of the present disclosure is not limited by the effects.

BEST MODE

Figure 1:
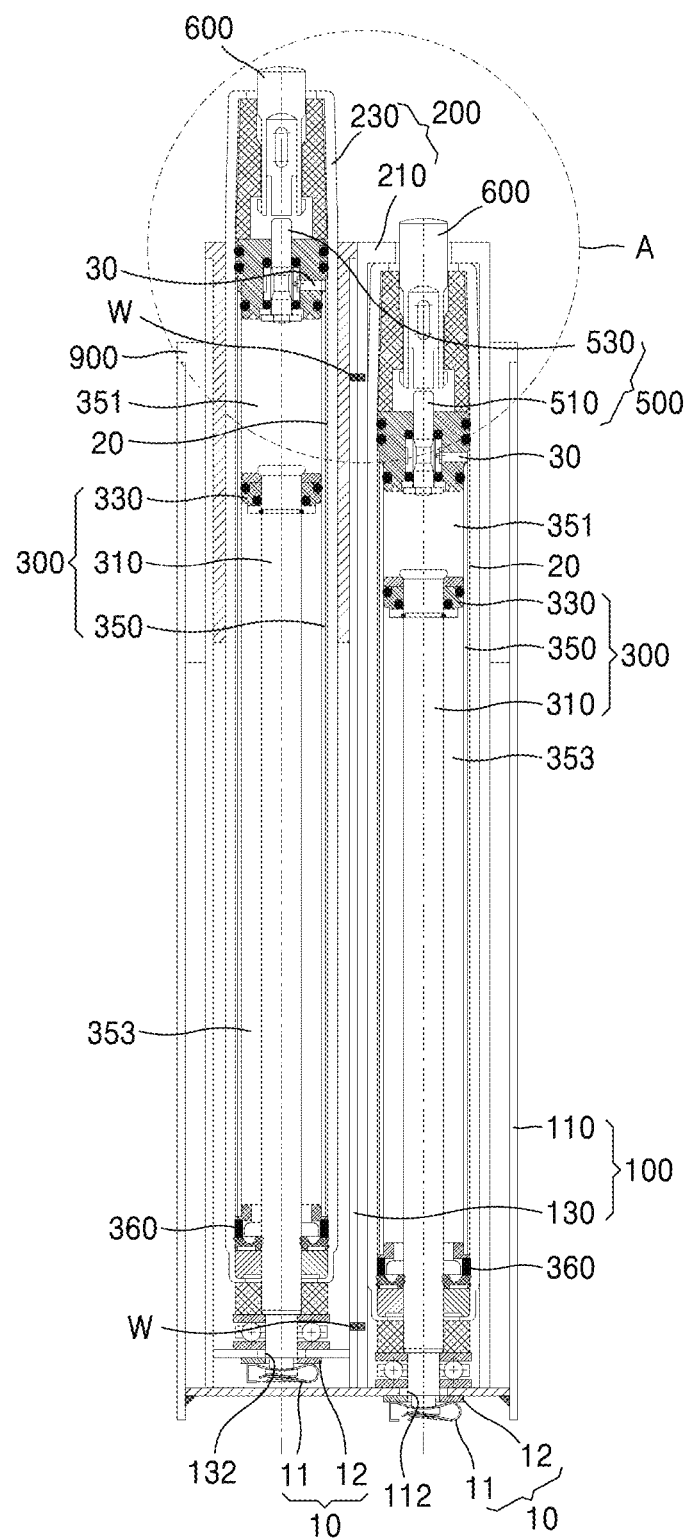
FIG. 1 is a front cross-sectional view illustrating a multi-step height adjuster according to a first embodiment of the present disclosure.

The present disclosure may apply various modifications and have various embodiments, and specific embodiments will be illustrated in the drawings and described in detail in the detailed description. Effects and characteristics of the present disclosure, and a method of achieving the effects and characteristics will be apparent with reference to the embodiments described below in detail together with the drawings. However, the present disclosure is not limited to the embodiments to be described below and may be implemented in various forms.

Hereinafter, embodiments of the present disclosure will be described in detail with reference to the accompanying drawings, and when describing with reference to the drawings, the same or corresponding components are denoted by the same reference numerals, and redundant description thereof is omitted.

In the following embodiments, terms such as "first" and "second" are not used in a limiting meaning but used for the purpose of distinguishing one component from another component.

In the following examples, singular expressions include plural expressions unless the context clearly indicates otherwise.

In the following embodiments, a term such as "include" or "have" means that characteristics or components described in the specification are present, and do not preclude a possibility of adding one or more other characteristics or components.

In the following embodiments, when it is described that a portion such as a film, a region, or a component is on or over another portion, this includes not only a case in which the portion is directly on another portion, but also a case in which another film, region, component, or so on is interposed therebetween.

In the drawings, components may be exaggerated or reduced in size for the sake of convenient description. For example, a size and a thickness of each component illustrated in the drawings are randomly illustrated for the sake of convenient description, and thus the present disclosure is not limited to the illustration.

When a certain embodiment may be implemented differently, a specific process order may be performed differently from the order to be described. For example, two processes described in succession may be performed substantially simultaneously or may be performed in an order opposite to the described order.

In the following embodiments, when it is described that a film, a region, a component, or so on is connected, this includes not only a case in which the film, the region, the component, or so on is directly connected, but also a case in which the film, the region, the component, or so on is indirectly connected with another film, region, component, or so on interposed therebetween. For example, in the present specification, when it is described that a film, a region, a component, or so on is electrically connected, this includes not only a case in which the film, the region, the component, or so on is directly and electrically connected, but also a case in which the film, the region, the component, or so on is indirectly and electrically connected with another film, region, component, or so on.

First Embodiment

Figure 2:
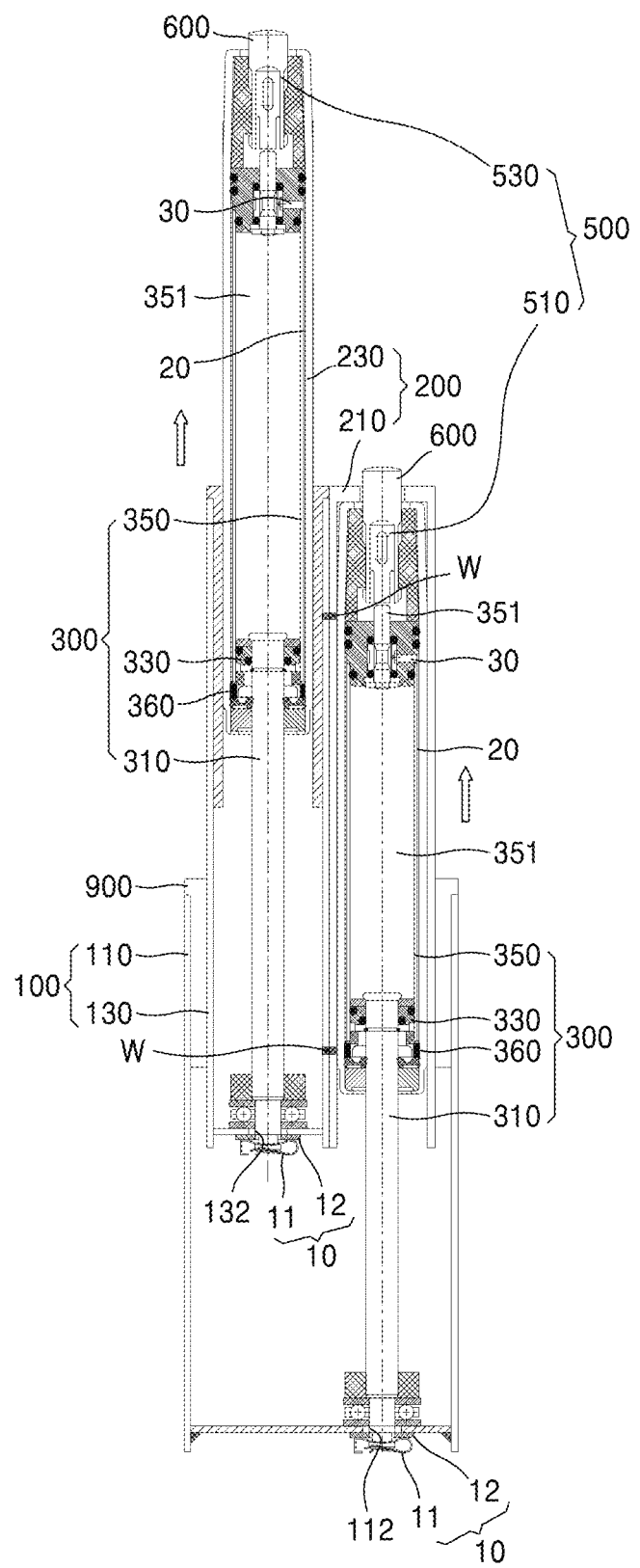
FIG. 2 is a front cross-sectional view illustrating a primary extension of the multi-step height adjuster according to the first embodiment of the present disclosure.
Figure 3A:
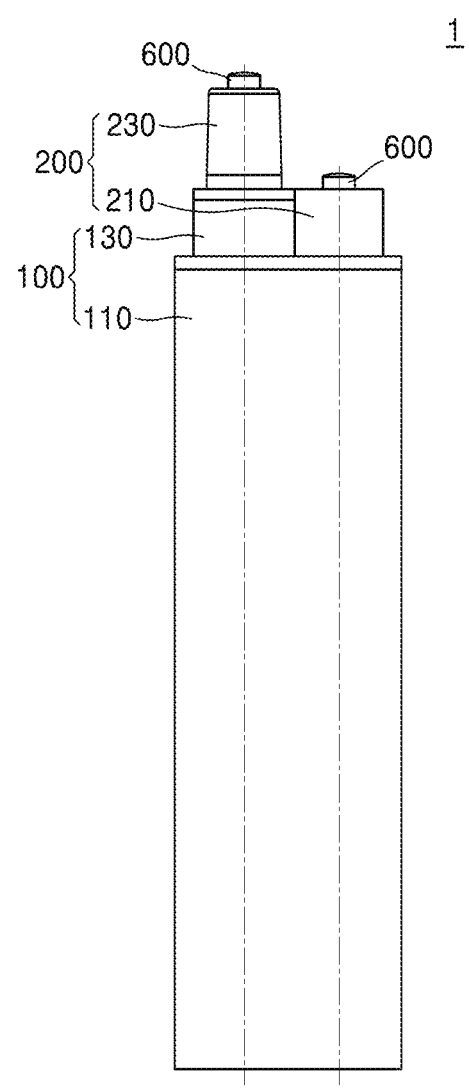
FIGS. 3A to 3C are front views schematically illustrating operation states of the multi-step height adjuster according to the first embodiment of the present disclosure.
Figure 3B:
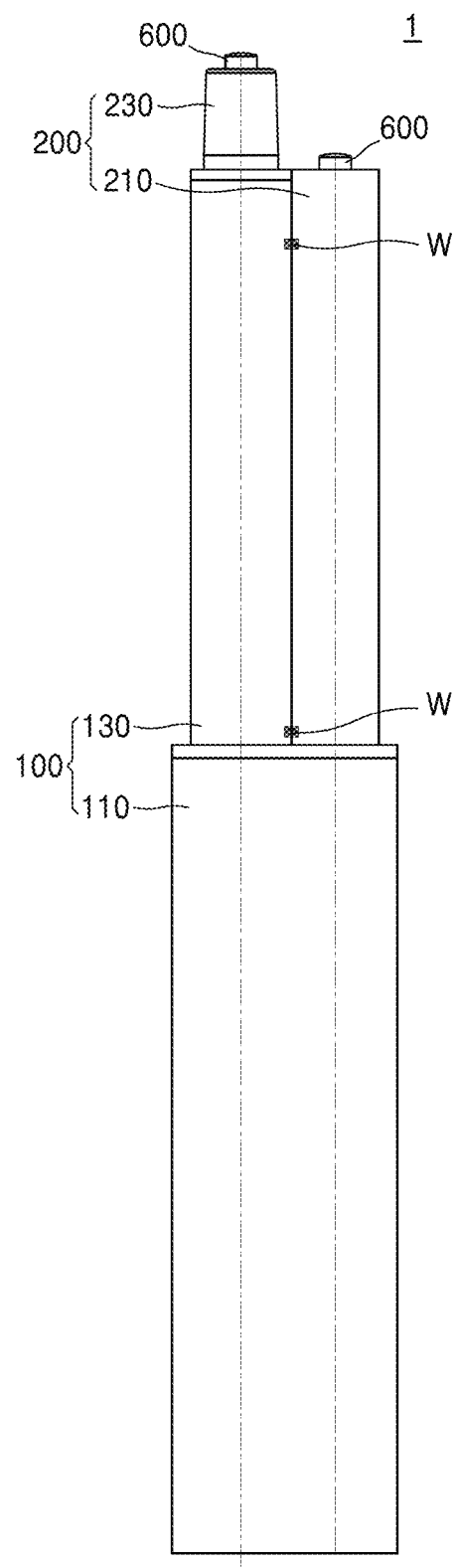
Figure 3C:
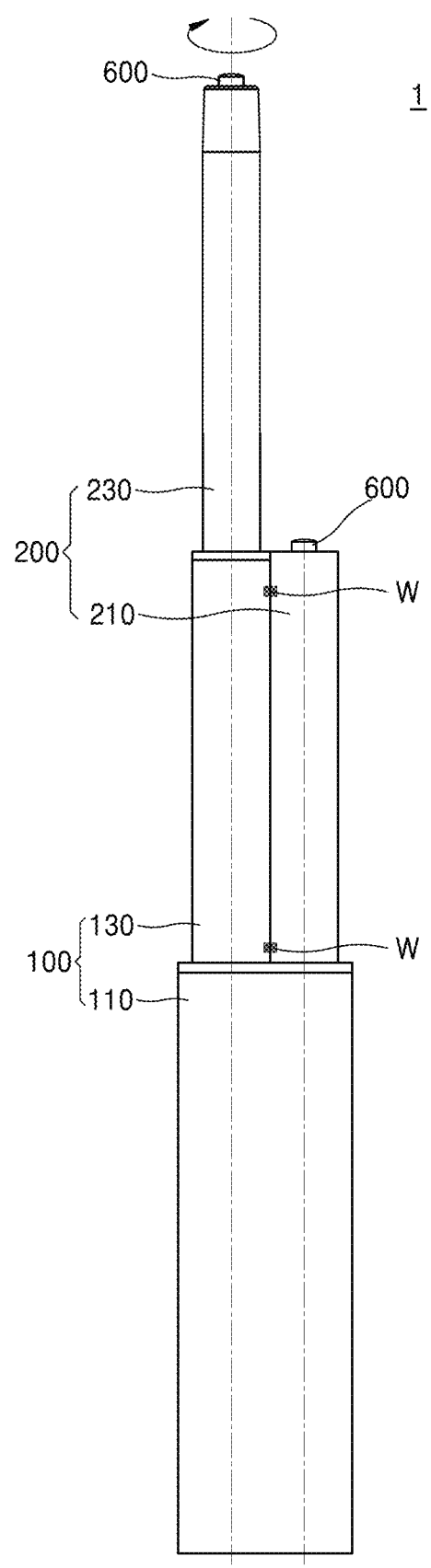
Figure 3D:
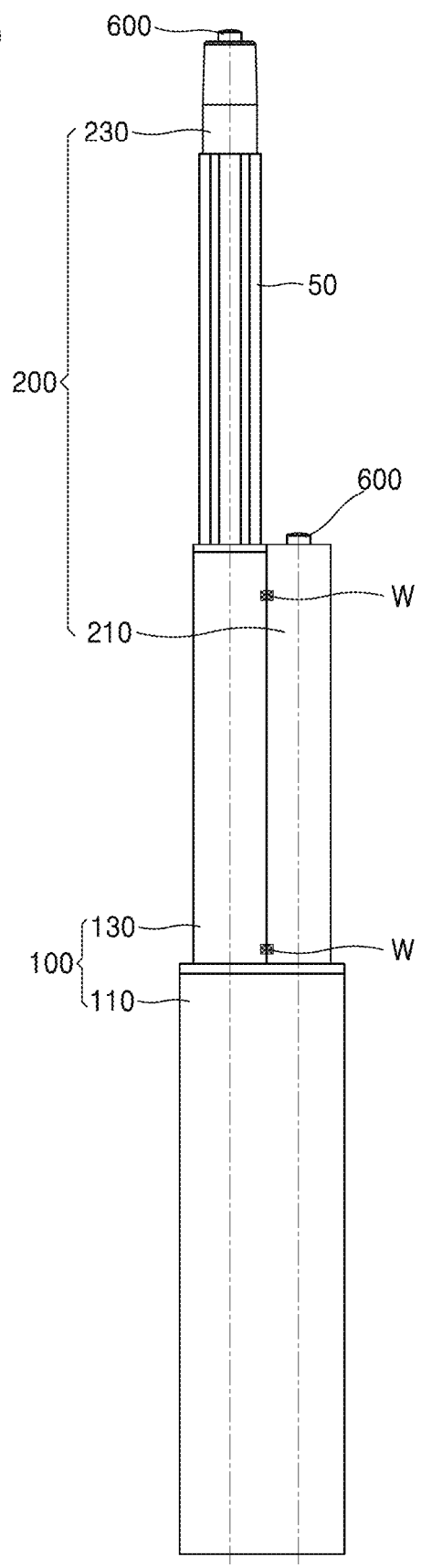
FIGS. 3D and 3E are front views schematically illustrating operation states of a multi-step height adjuster in which a sleeve is installed, according to an embodiment of the present disclosure.
Figure 3E:
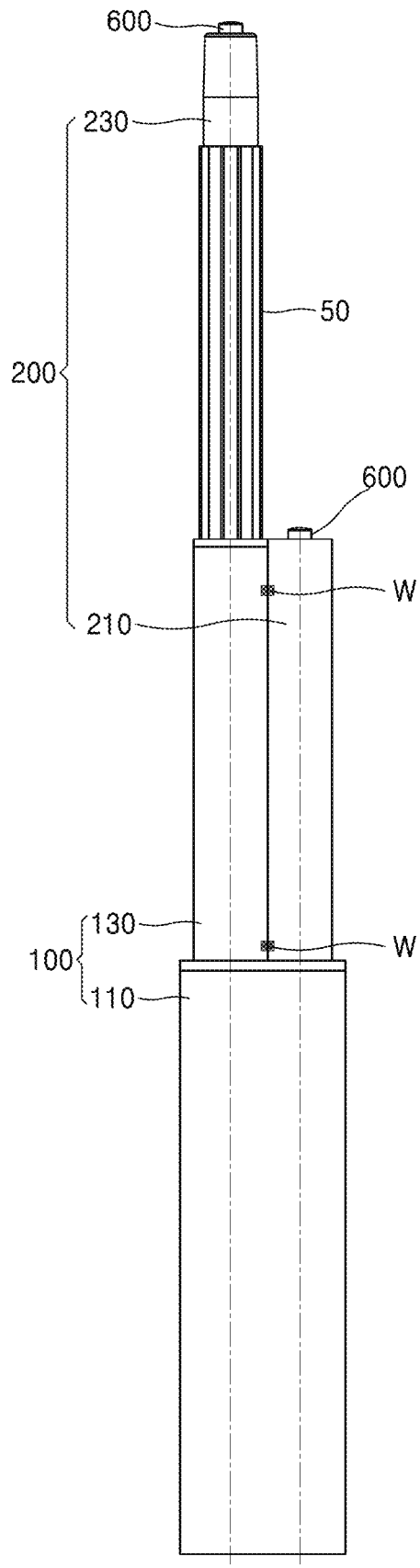
Figure 4:
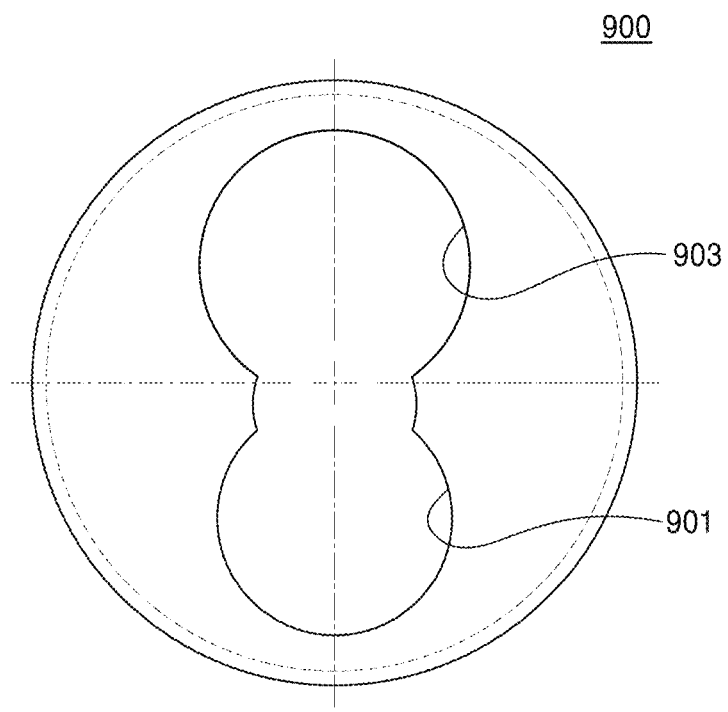
FIG. 4 is a plan view illustrating a spindle guide portion according to the first embodiment of the present disclosure.
Figure 5:
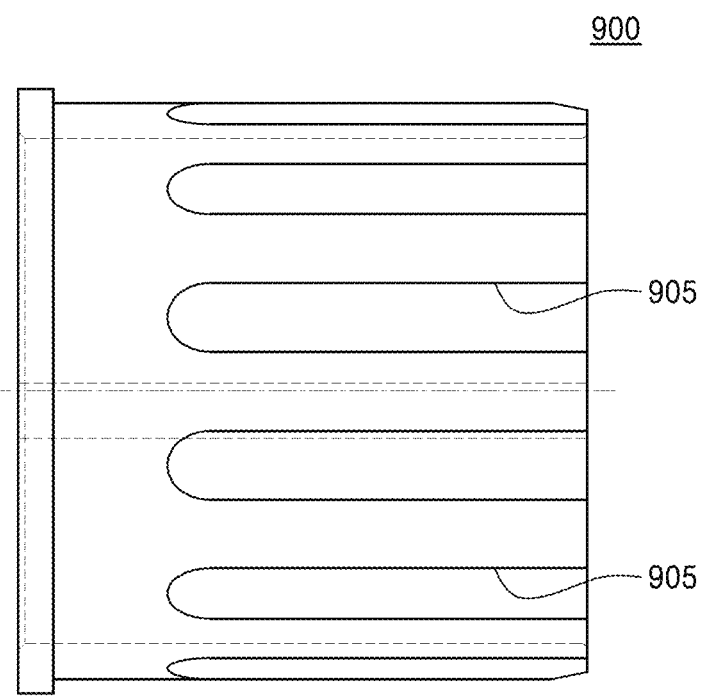
FIG. 5 is a side view illustrating the spindle guide portion according to the first embodiment of the present disclosure.
Figure 6:
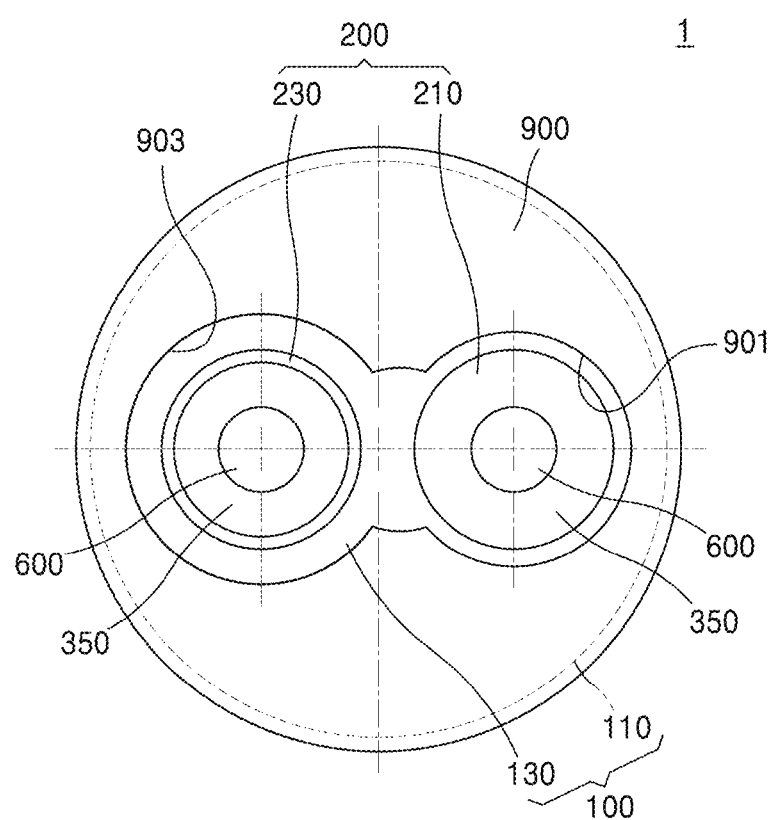
FIG. 6 is a plan view illustrating the multi-step height adjuster according to the first embodiment of the present disclosure.

FIG. 1 is a front cross-sectional view illustrating a multi-step height adjuster according to a first embodiment of the present disclosure. FIG. 2 is a front cross-sectional view illustrating a primary extension of the multi-step height adjuster according to the first embodiment of the present disclosure. FIGS. 3A to 3C are front views schematically illustrating operation states of the multi-step height adjuster according to the first embodiment of the present disclosure. FIGS. 3D and 3E are front views schematically illustrating operation states of a multi-step height adjuster in which a sleeve is installed, according to an embodiment of the present disclosure. FIG. 4 is a plan view illustrating a spindle guide portion according to the first embodiment of the present disclosure. FIG. 5 is a side view illustrating the spindle guide portion according to the first embodiment of the present disclosure. FIG. 6 is a plan view illustrating the multi-step height adjuster according to the first embodiment of the present disclosure. FIGS. 7 to 10 are plan views illustrating multi-step height adjusters according to embodiments of the present disclosure.

Referring to FIGS. 1 to 10, a multi-step height adjuster 1 according to a first embodiment of the present disclosure includes a base tube portion 100, a spindle portion 200, an adjustment portion 300, an opening/closing pin portion 500, a controller 600, and a spindle guide portion 900.

Referring to FIGS. 1, 2, and 3A, the base tube portion 100 according to the first embodiment of the present disclosure forms a main body of the multi-step height adjuster 1 to form an exterior. The base tube portion may have a hollow therein and may include a first base tube 110 and a second base tube 130.

Because the base tube portion 100 may have a hollow therein, the spindle portion 200 and the piston rod 310 to be described below may be installed in an inner space. The base tube portion 100, that is, the first base tube 110 and the second base tube 130 may each have one surface provided with a fixed plate (no reference numeral), and through-hole portions 112 and 132 may be formed in the fixed plate.

The base tube portion 100 may be coupled to the spindle guide portion 900 to be described below in order to induce a vertical reciprocating motion of the spindle portion 200 into a linear motion and to prevent a wobble phenomenon in which the spindle portion 200 shakes left and right during the linear motion of the spindle portion 200.

The first base tube 110 has one surface (a lower surface in FIG. 1) formed with the through-hole portions 112 and 132, and a piston rod 310 to be described below is inserted into the through-hole portions 112 and 132. The second base tube 130 has one surface (a lower surface in FIG. 1) formed with through-hole portions and is formed to enable vertical reciprocation inside the first base tube 110.

Figure 9:
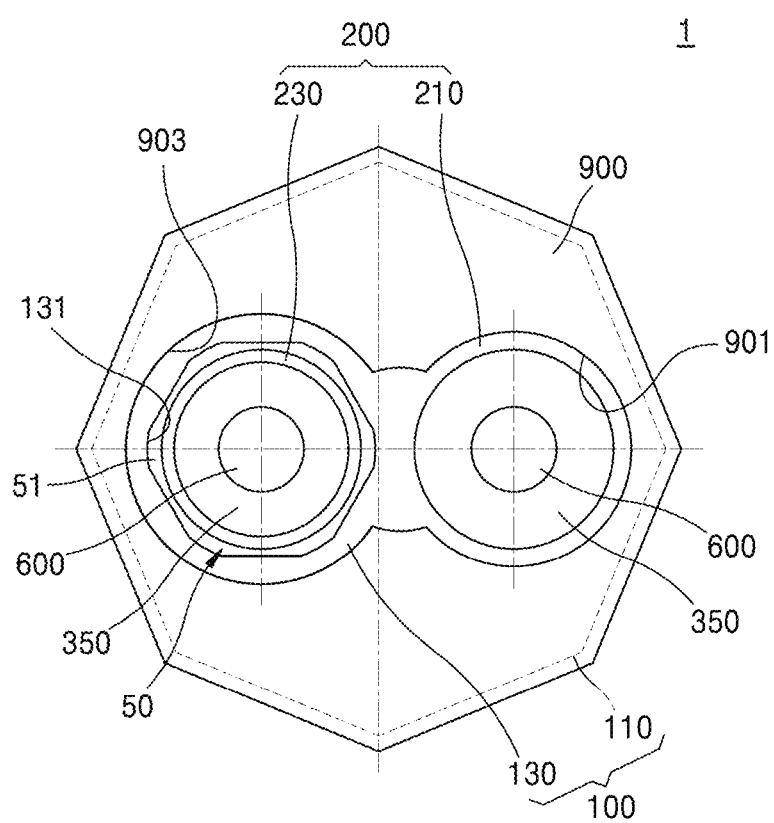
Figure 10:
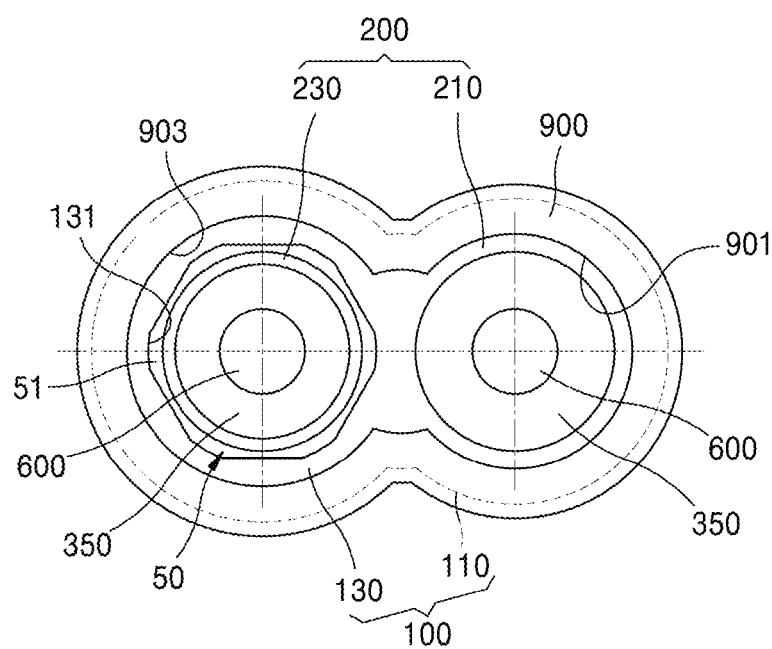

Referring to FIGS. 6, 9, and 10, an outer shape of the first base tube 110 may be formed in a circular shape, a polygonal shape or a streamlined shape. By being formed to have a different external shape, there are effects in that a user may conveniently hold the first base tube 110 and because a weight of the first base tube 110 may be adjusted, the weight and an outer shape of the first base tube 110 may be set differently depending on a subject (not illustrated) supported by the multi-step height adjuster 1 according to the embodiments of the present disclosure.

The second base tube 130 according to the first embodiment of the present disclosure may move integrally with the first spindle 210 to be described below. In the present specification, the second base tube 130 is formed integrally with the first spindle 210 but is not limited thereto, and various modifications may be made, such as being formed as separate members and coupled to each other to integrally move.

Specifically, when the second base tube 130 and the first spindle 210 are independently formed and coupled to each other, outer circumferential surfaces of the second base tube 130 and the first spindle 210 may be coupled to each other by welding, an adhesive, or a coupling member such as an embo or a pin.

Specifically, referring to FIGS. 1 to 3C, when the second base tube 130 and the first spindle 210 are welded together, the second base tube 130 and the first spindle 210 may be welded together in a predetermined coupling region W to be moved integrally. This may be equally applied to the multi-step height adjuster illustrated in FIGS. 11 to 15 to be described below.

An outer diameter of the second base tube 130 may be formed to be greater than an outer diameter of the first spindle 210 to be described below. In addition, an inner diameter of the second base tube 130 may be formed to be greater than the outer diameter of the first spindle 210. Due to this, a diameter of the first spindle guide hole 901 formed in a guide portion to be described below may be formed relatively less than a diameter of the second spindle guide hole 903.

In addition, as the diameter of the first spindle guide hole 901 is formed relatively less than the diameter of the second spindle guide hole 903, inner diameters and outer diameters of the first spindle 210 and the second spindle 230 may be formed to be the same as each other.

However, the present disclosure is not limited thereto, and as the diameters of the first spindle 210 and the second base tube 110 are set differently, various modifications may be made, such as forming the diameter of the first spindle guide hole 901 to be relatively greater than the diameter of the second spindle guide hole 903.

Referring to FIGS. 7 to 10, an inner diameter corresponding to a distance from a central axis to an inner circumferential surface of the second base tube 130 according to the first embodiment of the present disclosure may be formed differently. Because an inner diameter of the second base tube 130 is formed differently along the inner circumferential surface, a groove portion 131 may be formed.

Referring to FIGS. 7 to 10, a sleeve 50 may be installed between the inner circumferential surface of the second base tube 130 and the second spindle 230. The sleeve 50 may be coupled to the second spindle 230, and specifically, an inner surface of the sleeve 50 and an outer surface of the second spindle 230 may be coupled to each other by an adhesive member, an embo, a pin, or so on and may be moved integrally.

Referring to FIGS. 7 to 10, the groove portion 131 formed along an inner circumferential surface of the second base tube 130 may have a curved shape or a polygonal shape, and specifically, referring to FIGS. 7 to 10, protrusion portions 51 may be formed along an outer circumferential surface of the sleeve 50 to correspond to the groove portion 131 formed along the inner circumferential surface of the base tube 130.

As the protrusion portions 51 are formed in the sleeve 50 and the protrusion portions 51 are arranged inside the groove portion 131 formed along the inner circumferential surface of the second base tube 130, the second spindle 230 and the sleeve 50 are prevented from rotating around a central axis thereof in a longitudinal direction when vertically reciprocating inside the second base tube 130.

Figure 7:
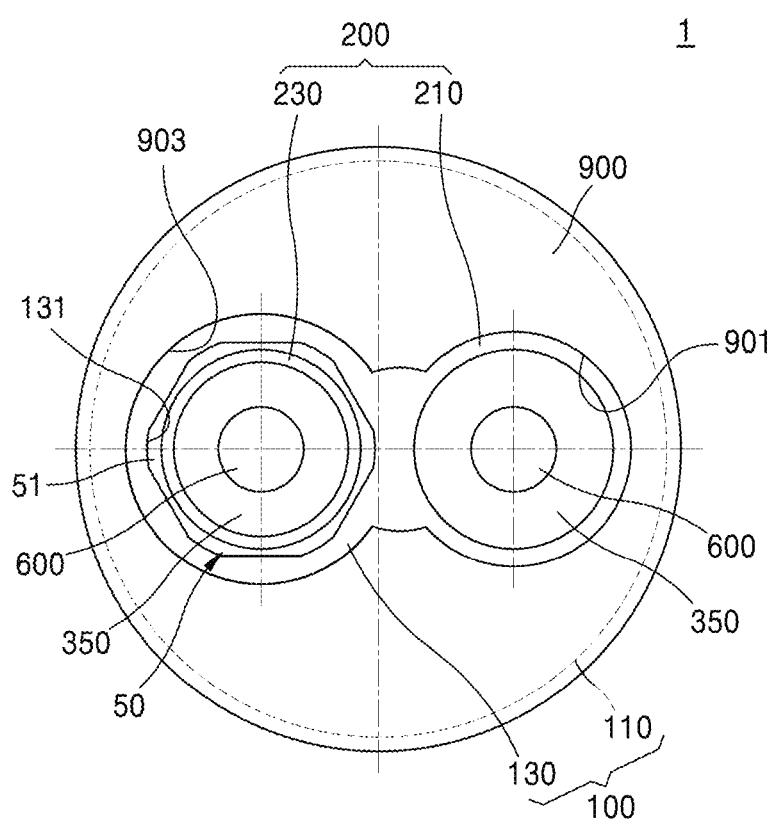
FIGS. 7 to 10 are plan views illustrating multi-step height adjusters according to embodiments of the present disclosure.

FIG. 7 illustrates that an outer shape of the sleeve 50 is formed in a hexagonal column shape so that the protrusion portions 51 are each arranged between respective surfaces, and a front view illustrating an operation state of the multi-step height adjuster 1 therefor is illustrated in FIG. 3D.

Figure 8:
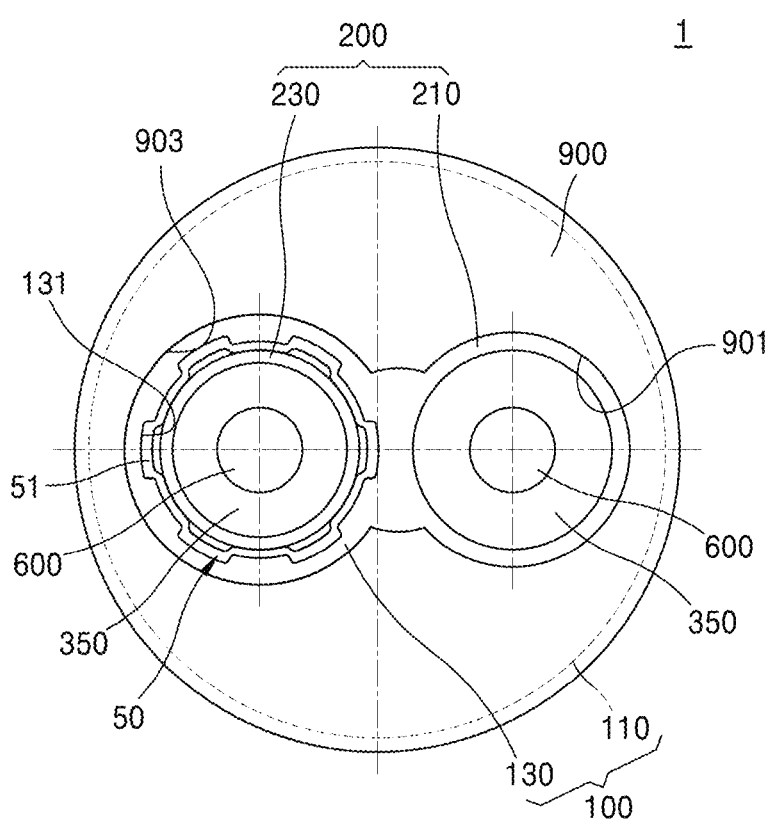

Referring to FIG. 8, the outer shape of the sleeve 50 in which the protrusion portions 51 are formed to be seated in the groove portion 131 formed along an inner surface of the second base tube 130, may be formed in a shape of a specials tube.

In a section where the protrusion portion 51 is not formed in the sleeve 50, an inner surface of the sleeve 50 is coupled to an outer surface of the second spindle 230, and thus, the second spindle 230 may be prevented from relatively rotating about the second base tube 130.

A front view illustrating an operation state of the multi-step height adjuster 1 of FIG. 8 is illustrated in FIG. 3E.

Although not illustrated in the present specification, the sleeve 50 may be installed between the first base tube 110 and the first spindle 210, and a groove portion may be formed along an inner circumferential surface of the first base tube 110, protrusion portions may be formed along an outer circumferential surface of the sleeve 50 facing the first base tube 110 and are arranged inside the groove portion, and thereby, the first spindle 210 coupled to the sleeve 50 may also be prevented from rotating around a central axis in the longitudinal direction inside the first base tube 110.

Referring to FIGS. 1, 2, and 6, the spindle portion 200 according to the first embodiment of the present disclosure may be coupled to the piston rod 310 to be described below to move linearly along the piston rod 310 and may include the first spindle 210 and the second spindles 230. The spindle portion 200 may be formed of a metal, a non-metal, or a resin material.

The first spindle 210 may be installed in the first base tube 110 to vertically reciprocate inside the first base tube 110, and the second spindle 230 may be installed in the second base tube 130 to vertically reciprocate inside the second base tube 130.

The first and second spindles 210 and 230 may have the same outer diameter, and the spindle portion 200, specifically, the first and second spindles 210 and 230 may have the adjustment portion 300 installed therein.

However, the first and second spindles 210 and 230 are not limited thereto and may also have different outer diameters.

The first spindle 210 according to the first embodiment of the present disclosure may be moved integrally with the second base tube 130. In the present specification, the first spindle 210 may be formed integrally with the second base tube 130 but is not limited thereto, and various modifications may be made, such as being formed as separate members and coupled to each other to integrally move.

Specifically, when the first spindle 210 and the second base tube 130 are separately formed and coupled to each other, the outer circumferential surfaces of the first spindle 210 and the second base tube 130 may be coupled to each other by welding, an adhesive, or a coupling member such as an embo or a pin.

In the present disclosure, the spindle portion 200, specifically, the first spindle 210 and the second spindle 230 may be formed in a circular shape but are not limited thereto and may be formed in a polygonal shape or a streamlined shape.

Referring to FIGS. 1 and 2, the adjustment portion 300 according to the first embodiment of the present disclosure is installed in the spindle portion 200, and the spindle portion 200, specifically, the first spindle 210 and the second spindle 230 transmit power by vertically reciprocating inside the first base tube 110 and the second base tube 130, respectively.

The adjustment portion 300 according to the embodiment of the present disclosure may consist of either a gas cylinder or a gas spring. However, the adjustment portion 300 is not limited thereto and may consist of a hydraulic cylinder 350.

Referring to FIGS. 1 and 2, the adjustment portion 300 according to the first embodiment of the present disclosure may be formed in a gas cylinder type, and the adjustment portion 300 may include the piston rod 310, a piston assembly 330, a cylinder 350.

The piston rod 310 is inserted into the base tube portion 100 to be coupled thereto through the through-hole portions 112 and 132 formed in the base tube portion 100. The piston assembly 330 is coupled to the piston rod 310 and relatively moves inside the spindle portion 200. The cylinder 350 is inserted into the spindle portion 200 and is in surface-contact with the piston assembly 330.

The piston rod 310 is coupled to the base tube portion 100 by a fixed member 10. Specifically, a fixed clip 11 is coupled to a lower end portion of the piston rod 310 so that the piston rod 310 is not removed from the base tube portion 100. A clip washer 12 is inserted between the base tube portion 100 and the fixed clip 11, and thereby, the base tube portion 100 may be prevent from being damaged by coming into direct contact with the fixed clip 11.

The spindle portion 200 may be coupled to the piston rod 310 to linearly move along the piston rod 310. The cylinder 350 may be installed in an inner space of the spindle portion 200 to control movement of gas between gas chambers 351 and 353.

The piston rod assembly 330 is mounted on one end of the piston rod 310, and an inner space of the cylinder 350 may be divided into the upper chamber 351 and the lower chamber 353 by the piston rod assembly 330. A gas flow path 20 may be formed between an outer circumferential surface of the cylinder 350 and an inner circumferential surface of the spindle 200 so that gas is moved between the upper chamber 351 and the lower chamber 353.

Volumes of the upper chamber 351 and the lower chamber 353 are changed by gas that moves through the gas flow path 20, and thereby, the spindle portion 200 may vertically reciprocate along the piston rod 310.

Referring to FIGS. 1 and 2, the opening/closing pin portion 500 according to the first embodiment of the present disclosure may seal one side of the cylinder 350 and control entry and exit of gas and include a first opening/closing pin 510 and a second opening and closing pin 530.

The first opening/closing pin 510 is coupled to the first spindle 210 or the first base tube 110 to open and close a gas flow path to the inside of the first spindle 210, and the second opening/closing pin 530 is coupled to the second spindle 230 to open and close the gas flow path to the inside of the second spindle 230.

Specifically, in FIGS. 1 and 2, the first opening/closing pin 510 is coupled to the first spindle 210 that is an upper side (see FIG. 1) of the piston rod 310 and is coupled to the first base tube 110 that is a lower side (see FIG. 11) of the piston rod 310 in a multi-step height adjuster 1 according to a second embodiment illustrated in FIG. 11 to be described below, and the first opening/closing pin 510 may be coupled to the first spindle 210 or the first base tube 110 by varying positions according to design conditions.

Referring to FIGS. 1 and 2, the controller 600 according to the first embodiment of the present disclosure is connected to the opening/closing pin portion 500 to control movement of the opening/closing pin portion 500.

The controller 600 according to the first embodiment of the present disclosure may be formed in a button manner and may come into contact with an opening/closing pin to press the opening/closing pin when a user presses the controller 600, and thereby, the opening and closing pin portion 500 is moved to open or close the gas flow path 20.

Figure 12A:
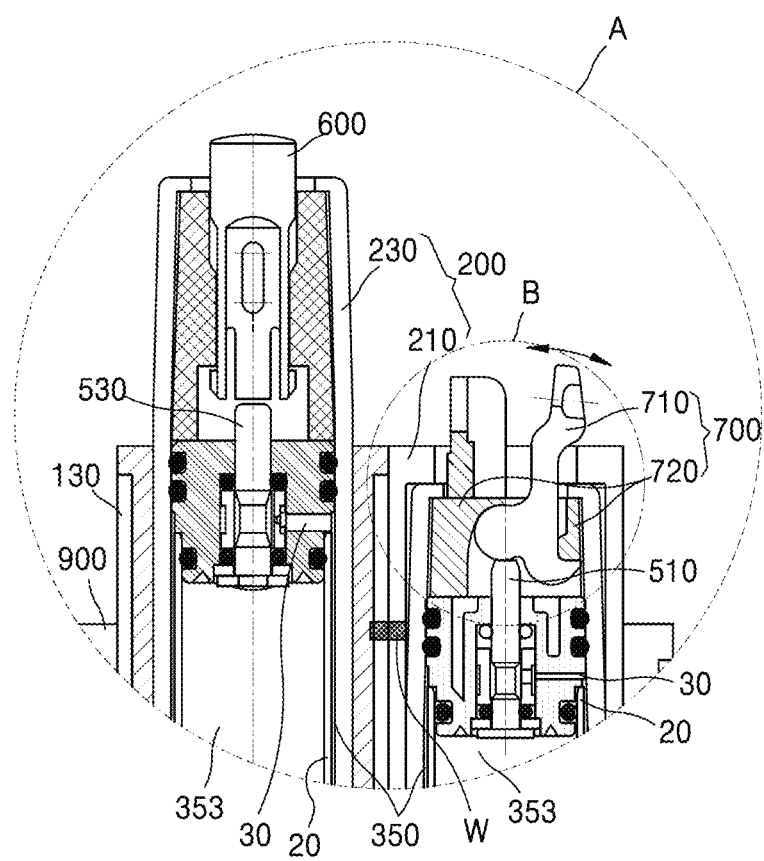
FIG. 12A is a view illustrating a controller of a multi-step height adjuster according to a third embodiment of the present disclosure, which corresponds to a portion A of FIG. 1.
Figure 13:
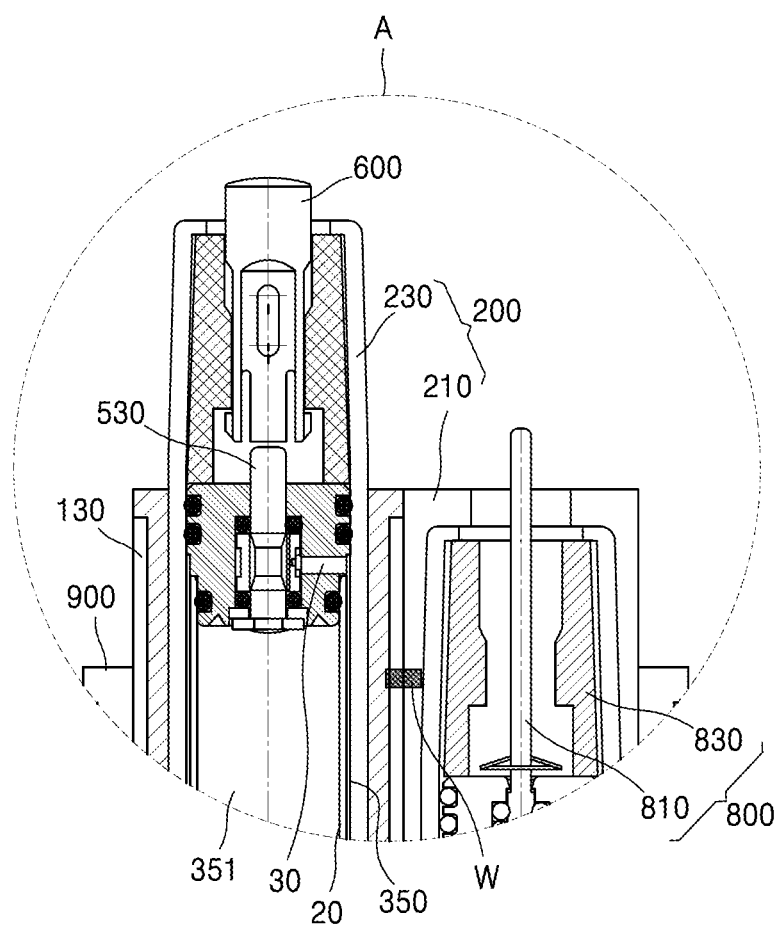
FIG. 13 is a view illustrating a controller of a multi-step height adjuster according to a fifth embodiment of the present disclosure, which corresponds to a portion A of FIG. 1.

Referring to FIGS. 12A and 13, a portion A of the embodiment of FIG. 1 is enlarged, and the controller 600 may be formed in a cable type or a joystick type. A detailed description thereof will be described below.

Referring to FIGS. 4 and 5, the spindle guide portion 900 according to the first embodiment of the present disclosure is inserted into the first base tube 110 to be coupled thereto and is arranged on the outside of the first spindle 210 and the second base tube 130 to guide elevation paths of the first spindle 210 and the second base tube 130.

The spindle guide portion may be formed with a first spindle guide hole 901 that shares a central axis with the first spindle 210 and is arranged outside the first spindle 210, and a second spindle guide hole 903 that shares a central axis with the second base tube 130 and is arranged outside the second base tube 130.

Specifically, an inner diameter of the first spindle guide hole 901 is formed to be greater than or equal to an outer diameter of the first spindle 210, and an inner diameter of the second spindle guide hole 903 is formed to be greater than or equal to an outer diameter of the second base tube 130.

The first spindle guide hole 901 and the second spindle guide hole 903 may be connected to each other to be integrally formed. Due to this, a streamlined cross-sectional view may be formed when forming a cross-section perpendicular to a longitudinal axis of the spindle guide formed by the first spindle guide hole 901 and the second spindle guide hole 903.

According to the first embodiment of the present disclosure, a diameter of the first spindle guide hole 901 may be formed to be less than a diameter of the second spindle guide hole 903. Due to this, the second base tube 130 having an outer diameter greater than an outer diameter of the first spindle 210 may be inserted through the second spindle guide hole 903, and the second spindle 230 vertically reciprocating inside the second base tube 130 may be formed to have the same outer diameter as the first spindle 210.

The spindle guide portion 900 according to the first embodiment of the present disclosure is installed on one side (an upper side of FIG. 1) of the base tube portion 100. In the present disclosure, the spindle guide portion 900 is formed as a separate member and is coupled to the base tube portion 100 to facilitate installation, repair, and management of the multi-step height adjuster 1.

However, the spindle guide portion 900 is not limited thereto and may extend from the base tube portion 100 to be formed integrally with the base tube portion 100, and various modifications may be made for the sake of convenient manufacture. However, in the following description, for the sake of convenient description, a case in which the spindle guide portion 900 is separated from the base tube portion 100 will be mainly described.

Referring to FIG. 5, a spindle guide groove 905 may be formed on an outer circumferential surface of the spindle guide portion 900 according to the first embodiment of the present disclosure in a longitudinal direction.

Due to the spindle guide groove 905 formed in the spindle guide portion 900, there is an effect of being pressed to be easily inserted into the first base tube 110 compared with the spindle guide portion 900 formed in a circular shape without forming the spindle guide groove 905.

An operation principle and an effect of the multi-step height adjuster 1 according to the first embodiment of the present disclosure described above will be described.

Referring to FIGS. 1 to 10, the multi-step height adjuster 1 according to the first embodiment of the present disclosure may include the base tube portion 100, the spindle portion 200, the adjustment portion 300, the opening/closing pin portion 500, the controller 600, and the spindle guide portion 900.

When an operation lever (not illustrated) connected to the controller 600 is pressed or raised, the controller 600 is lowered (see FIG. 1). Because the controller 600 is in contact with the opening/closing pin portion 500, the opening/closing pin portion 500 is also lowered by lowering of the controller 600.

Before the operation lever operates, the opening/closing pin portion 500 closes the orifice 30 connected to the inside of the cylinder 350, and thus, the cylinder 350 and the orifice 30 communicate with each other by lowering of the opening/closing pin portion 500.

Because the orifice 30 is connected to the gas flow path 20, gas pressed in the lower chamber 353 flows into the upper chamber 351 through the orifice 30 and the gas flow path 20. In this case, a volume of the lower chamber 353 decreases and a volume of the upper chamber 351 increases, and thereby, the spindle portion 200 and the cylinder 350 are raised.

Lowering motions of the spindle portion 200 and the cylinder 350 are also similar to the raising motion described above. When an operation lever (not illustrated) connected to the controller 600 is pressed or raised, the orifice 30 is opened by lowering of the controller 600 and lowering of the opening/closing pin portion 500. In this case, when a user presses the multi-step height adjuster 1 downward, the pressed gas in the upper chamber 351 flows to the lower chamber 353 along the gas flow path 20.

In this case, a volume of the upper chamber 351 decreases and a volume of the lower chamber 353 increases, and thus, the spindle portion 200 and the cylinder 350 are lowered.

Referring to FIGS. 3A to 3C, the spindle portion 200 includes the first spindle 210 and the second spindle 230 in the above description, and specifically, the first spindle 210 and the cylinder 350 are raised by the controller 600 installed in the first spindle 210, and at this time, the second base tube 130, which is moved integrally with the first spindle 210, is raised inside the first base tube 110.

Then, while the second spindle 230 and the cylinder 350 are raised inside the second base tube 130 by the controller 600 installed in the second spindle 230, a higher stroke may be obtained compared with formation of a single spindle portion 200.

The increased stroke is proportional to the number of spindle portions 200, and in the present disclosure, the first spindle 210 and the second base tube 130 are coupled to each other to form two stages.

However, the first spindle 210 and the second base tube 130 are not limited thereto, and various modifications such as increasing the stroke to three or more stages may be made.

In addition, referring to FIG. 3C, the second spindle 230 in the second base tube 130 may rotate around a rotation central axis of the second spindle 230 in a clockwise direction or a counterclockwise direction.

Referring to FIGS. 4 and 5, the first spindle guide hole 901 and the second spindle guide hole 903 are formed in the spindle guide portion 900, and due to this, there is an effect that elevation paths of the first spindle 210 and the second base tube 130 may be guided.

Referring to FIG. 4, the second spindle guide hole 903 and the first spindle guide hole 901 share central axes with the second spindle 230 and the first spindle 210, respectively, and the second spindle guide hole 903 has a greater diameter from the center than the first spindle guide hole 901.

Accordingly, a diameter of the second base tube 130 inserted through the second spindle guide hole 903 is increased, and a diameter of the second spindle 230 may be formed to be equal to a diameter of the first spindle 210. Compared with the diameters of the first spindle 210 and the second base tube 130 being formed to be the same, the diameter of the second spindle 230 may be prevented from decreasing, and a subject may be stably supported when reaching a top dead point of the second spindle 230 during extension.

However, the present disclosure is not limited thereto, and as the diameters of the first spindle 210 and the second base tube 110 are set differently, the diameter of the first spindle guide hole 901 is formed to be relatively greater than the diameter of the second spindle guide hole 903, and various modifications may be made.

Referring to FIG. 5, the spindle guide groove 905 is formed along a periphery of the spindle guide portion 900 in the longitudinal direction of the spindle guide portion 900.

Due to the spindle guide groove 905 formed in the spindle guide portion 900, there is an effect of being pressed to be easily inserted into the first base tube 110 compared with the spindle guide portion 900 formed in a circular shape without forming the spindle guide groove 905.

Second Embodiment

Figure 11:
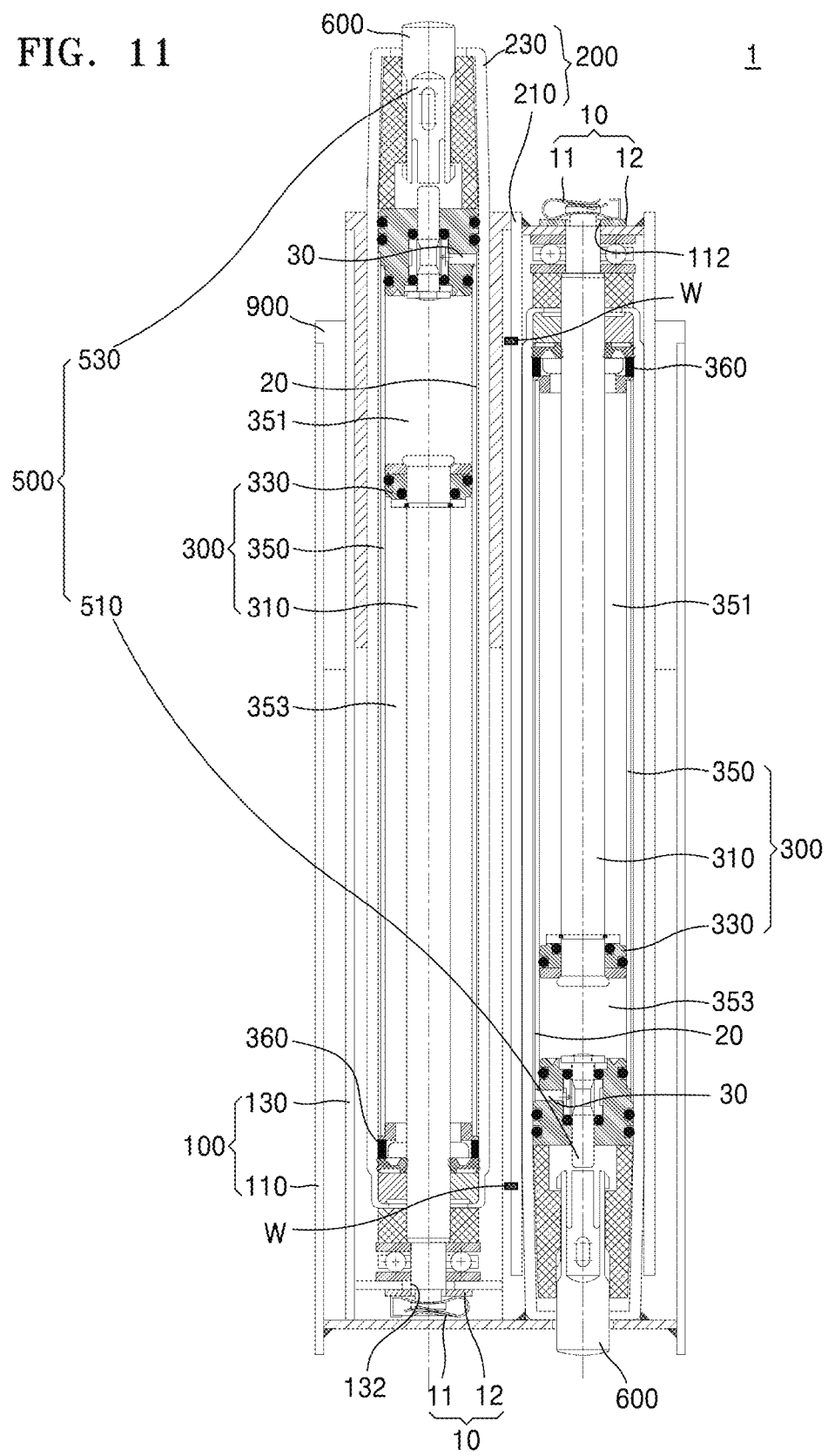
FIG. 11 is a front cross-sectional view illustrating a multi-step height adjuster according to a second embodiment of the present disclosure.

FIG. 11 is a front cross-sectional view illustrating a multi-step height adjuster according to a second embodiment of the present disclosure. A multi-step height adjuster 1 according to the second embodiment of the present disclosure may include a base tube portion 100, a spindle portion 200, an adjustment portion 300, an opening/closing pin portion 500, a controller 600, and a spindle guide portion 900.

Meanwhile, in the controller 300 of a gas cylinder type according to the second embodiment of the present disclosure, the opening/closing pin portion 500, specifically, the first opening/closing pin 510 is coupled to the first base tube 110 which is a lower side (see FIG. 11) of the piston rod 310, and the first spindle 210, the adjustment portion 300, and the controller 600, except for the first base tube 110, are formed upside down, compared with the first embodiment.

According to the second embodiment of the present disclosure, when an operation lever (not illustrated) connected to the controller 600 coupled to the first base tube 110 is pressed or raised, the controller 600 is raised (see FIG. 11). Because the controller 600 is in contact with the opening/closing pin portion 500, specifically the first opening/closing pin 510, the first opening/closing pin 510 is also raised by raising of the controller 600.

Before the operation lever operates, the first opening/closing pin 510 closed the orifice 30 connected to the inside of the cylinder 350, and thereby, the inside of the cylinder 350 and the orifice 30 communicate with each other by raising of the first opening/closing pin 510.

Because the orifice 30 is connected to the gas flow path 20, gas pressed in the upper chamber 351 flows into the lower chamber 353 through the orifice 30 and the gas flow path 20. In this case, a volume of the upper chamber 351 decreases and a volume of the lower chamber 353 increases, and thereby, the spindle portion 200 and the cylinder 350 are raised.

Lowering motions of the first spindle 210 and the cylinder 350 are similar to the raising motion described above. When an operation lever (not illustrated) connected to the controller 600 coupled to the first base tube 110 is pressed or raised, the orifice 30 is opened by raising of the controller 600 and the first opening/closing pin 510. In this case, when a user presses the multi-step height adjuster 1 downward, the pressed gas in the lower chamber 353 flows into the upper chamber 351 along the gas flow path 20.

In this case, the volume of the lower chamber 353 decreases and the volume of the upper chamber 351 increases, and thereby, the first spindle 210 and the cylinder 350 are lowered.

Referring to FIGS. 3A to 3C, in the above description, the spindle portion 200 includes the first spindle 210 and the second spindle 230, and specifically, the first spindle 210 and the cylinder 350 are raised by the controller 600 installed in the first spindle 210, and at this time, the second base tube 130, which is moved integrally with the first spindle 210, is raised inside the first base tube 110.

Then, while the second spindle 230 and the cylinder 350 are raised inside the second base tube 130 by the controller 600 installed in the second spindle 230, a higher stroke may be obtained compared with formation of a single spindle portion 200.

Except for this, other configurations, operation principles, and effects are the same as in the multi-step height adjuster 1 according to the first embodiment, and thus, redundant description thereof is omitted.

Third Embodiment

FIG. 12A is a view, which illustrates a controller of a multi-step height adjuster according to a third embodiment of the present disclosure, corresponding to the portion A of FIG. 1. Referring to FIGS. 1 and 12A, a multi-step height adjuster 1 according to the third embodiment of the present disclosure includes a base tube portion 100, a spindle portion 200, an adjustment portion 300, an opening/closing pin portion 500, a controller 700, and a spindle guide portion 900.

Meanwhile, in the multi-step height adjuster 1 according to the third embodiment of the present disclosure, the controller 700 may be formed in a cable gas cylinder type and may include a release arm 710 and a tapered holder 720. Referring to FIG. 12a, the release arm 710 is arranged to be in contact with the opening/closing pin portion 500, specifically, one end portion of a first opening/closing pin 510 to control opening and closing of the first opening/closing pin 510. The tapered holder 720 accommodates the release arm 710 therein and may be arranged inside the spindle portion 200, specifically, a first spindle 210.

Referring to FIG. 12A, a step portion may be formed on one side of the tapered holder 720, an end portion of the release arm 710 may be hooked on a lower side of the step portion (see FIG. 12A), and the release arm 710 may rotate in a clockwise direction or a counterclockwise direction about a central axis of the first opening/closing pin 510 by using the end portion of the release arm 710 in contact with and supported by the step portion as a rotation center.

As the release arm 710 rotates, the first opening/closing pin 510 is pressed to be lowered, and when the release arm 710 is returned to an original position, the first opening/closing pin 510 is raised.

There is an effect that the release arm 710 may press or release the first opening/closing pin 510 in a lever manner by using the step portion formed in the tapered holder 720.

The multi-step height adjuster 1 according to the third embodiment of the present disclosure has the same configuration, operation principle, and effect as the first and second embodiments, except that the controller 700 is formed in a cable gas cylinder type rather than a button portion type, and thus, redundant description thereof is omitted.

Fourth Embodiment

Figure 12B:
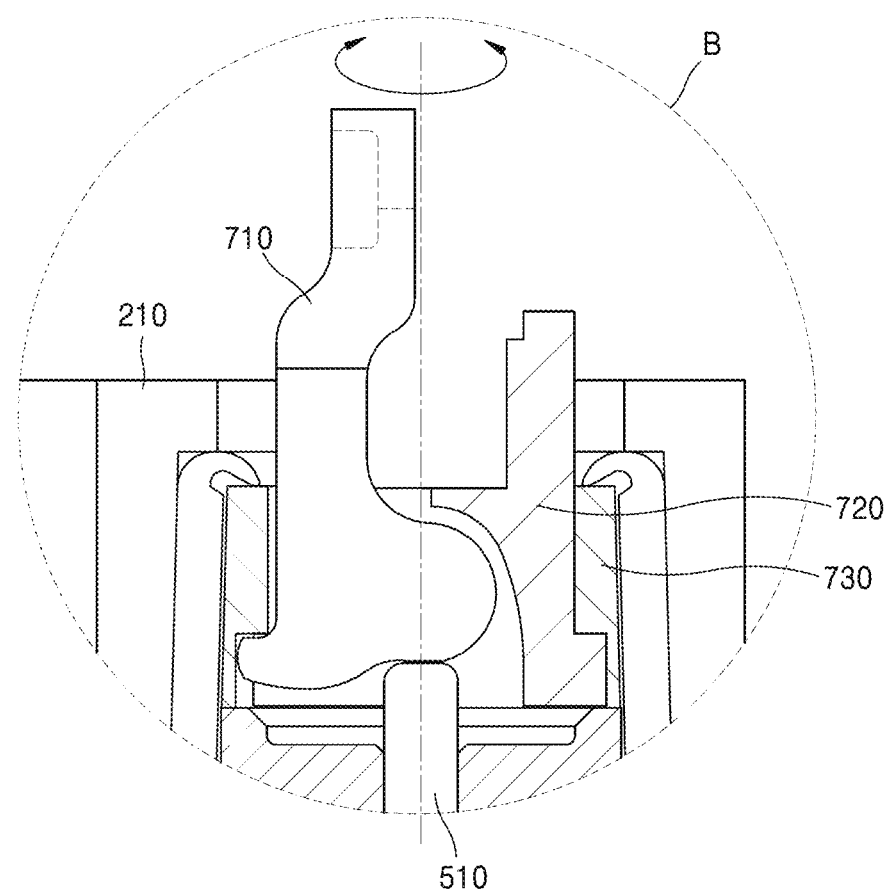
FIG. 12B is a view illustrating a controller of a multi-step height adjuster according to a fourth embodiment of the present disclosure, which corresponds to a portion B of FIG. 12A.

FIG. 12B is a view, which illustrates a controller of a multi-step height adjuster according to a fourth embodiment of the present disclosure, corresponding to a portion B of FIG. 12A corresponding to the portion A of FIG. 1. Referring to FIGS. 1 and 12B, a multi-step height adjuster 1 according to the fourth embodiment of the present disclosure may include a base tube portion 100, a spindle portion 200, an adjustment portion 300, an opening/closing pin portion 500, a controller 700, and a spindle guide portion 900.

Meanwhile, in the multi-step height adjuster 1 according to the fourth embodiment of the present disclosure, the controller 700 may be formed in a cable gas cylinder type, as in the third embodiment.

The controller 700 may include a release arm 710, a tapered holder 720, and a rotation guide member 730.

Referring to FIG. 12B, the release arm 710 may be arranged to be in contact with the opening/closing pin portion 500, specifically, one end portion of the first opening/closing pin 510 to control opening and closing of the first opening/closing pin 510. The tapered holder 720 accommodates the release arm 710 therein and may be arranged inside the spindle portion 200, specifically, the first spindle 210. The rotation guide member 730 may be arranged between the tapered holder 720 and the spindle portion 200, specifically, the first spindle 210, and guide rotation of the release arm 710 so that the tapered holder 720 is rotatable around the first spindle 210.

Referring to FIG. 12B, a step portion may be formed on one side of the rotation guide member 730, an end portion of the release arm 710 may be hooked on a lower side (see FIG. 12B) of the step portion, and the release arm 710 may rotate in a clockwise direction or a counterclockwise direction about a rotation central axis, which is a central axis in a longitudinal direction, of the first opening/closing pin 510. There is an effect that the release arm 710 may press or release the first opening/closing pin 510 in a lever manner by using the step portion formed in the rotation guide portion 730.

Although not illustrated, the controller 700 of a cable gas cylinder type according to the fourth embodiment of the present disclosure may also be installed in the second spindle 230.

Specifically, the release arm 710 may be arranged to be in contact with one end portion of a second opening/closing pin 530 to control opening and closing of the second opening/closing pin 530. The tapered holder 720 accommodates the release arm 710 therein and may be arranged inside the second spindle 230.

The rotation guide member 730 may be arranged between the tapered holder 720 and the second spindle 230 and may guide rotation of the release arm so that the release arm may rotate about the second spindle 230.

The multi-step height adjuster 1 according to the fourth embodiment of the present disclosure has the same configuration, operation principle, and effect as the third embodiment, except that the controller 700 further includes the rotation guide member 730 and the step portion is formed in the rotation guide member 730 rather than the tapered holder 720, and thus, redundant description thereof is omitted.

Fifth Embodiment

FIG. 13 is a view, which illustrates a controller of a multi-step height adjuster according to a fifth embodiment of the present disclosure, corresponding to the portion A of FIG. 1. Referring to FIGS. 1 and 13, a multi-step height adjuster 1 according to the fifth embodiment of the present disclosure may include a base tube portion 100, a spindle portion 200, an adjustment portion 300, an opening/closing pin portion 500, a controller 800, and a spindle guide portion 900.

Meanwhile, in the multi-step height adjuster 1 according to the fifth embodiment of the present disclosure, the controller 800 may be formed in a joystick type rather than a button portion type or a cable gas cylinder type and may include a stick portion 810 and a tapered holder 830.

The stick portion 810 may be in contact with the opening/closing pin portion 500, specifically, one end portion of the first opening/closing pin 510 and may be arranged to be rotatable om the spindle portion 200, specifically, at the center of the first spindle 210 to control opening and closing of the first opening/closing pin 510.

The stick portion 810 may be formed as a separate member to be coupled to the first opening/closing pin 510 and may be formed integrally therewith so that the first opening/closing pin 510 cooperates with movement of the stick portion 810 when a user operates the stick portion 810, and various modifications may be made.

The tapered holder 830 accommodates the stick portion 810 therein and may be arranged inside the spindle portion 200, specifically, the first spindle 210.

In the multi-step height adjuster 1 according to the fifth embodiment of the present disclosure, a user may rotate the stick portion 810 in the spindle portion 200, specifically, at the center of the first spindle 210, thereby raising or lowering the opening/closing pin portion 500, specifically, the first opening/closing pin 510.

Although not illustrated, the controller 800 of a joystick type according to the fifth embodiment of the present disclosure may be installed in the second spindle 230 as well.

Specifically, the stick portion 810 may be arranged to be in contact with one end portion of the second opening/closing pin 530 to control opening and closing of the second opening/closing pin 530. The tapered holder 830 accommodates the stick portion 810 therein and may be arranged inside the second spindle 230.

The multi-step height adjuster 1 according to the fifth embodiment of the present disclosure has the same configuration, operation principle, and effect as the first and second embodiments, except that the controller 800 is formed in a joystick type rather than a button portion type or a cable gas cylinder type, and thus, redundant description thereof is omitted.

Sixth Embodiment

Figure 14:
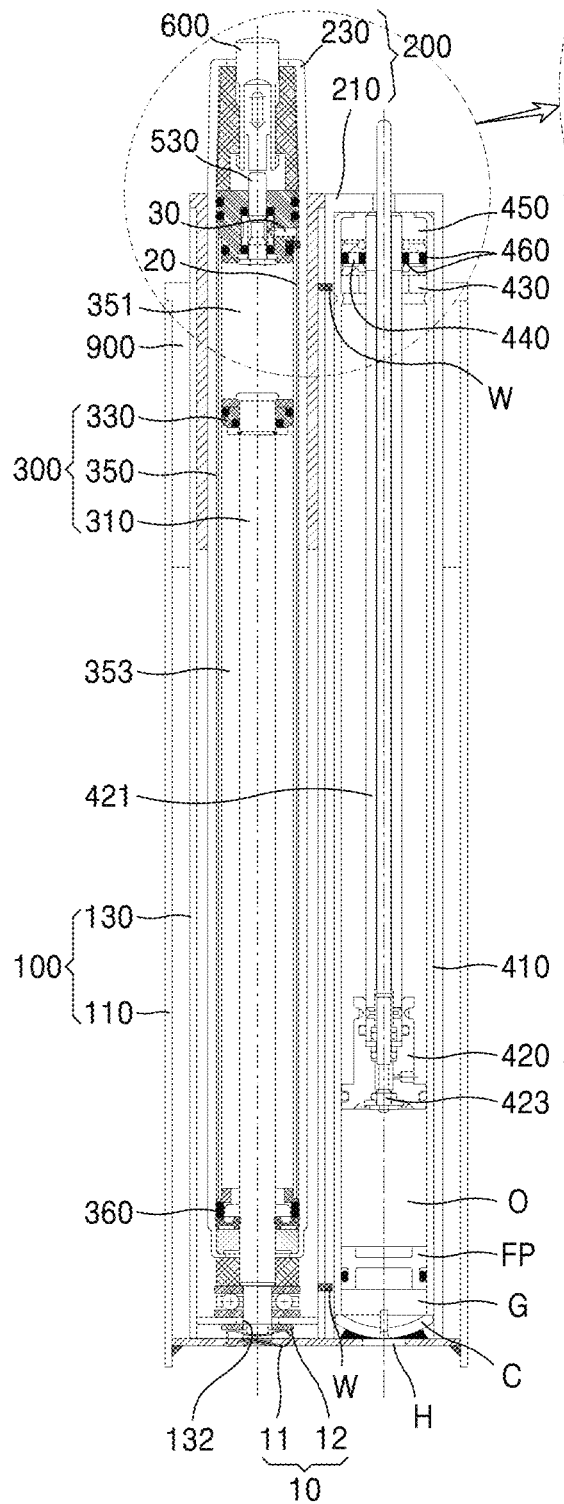
FIG. 14 is a view illustrating a multi-step height adjuster according to a sixth embodiment of the present disclosure.
Figure 14:
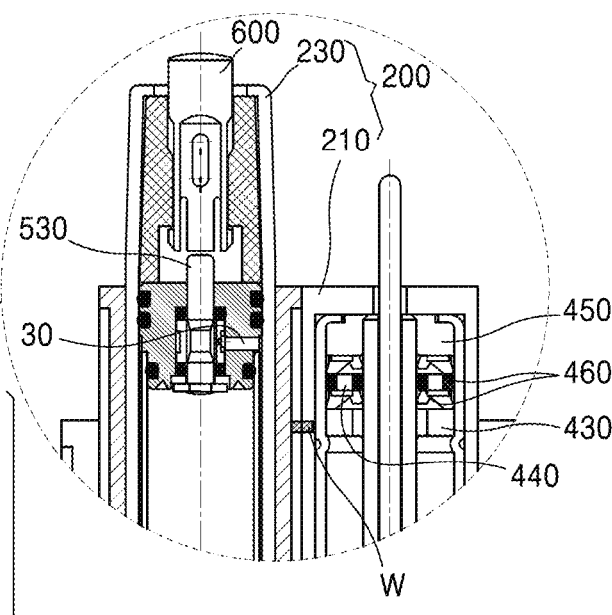

FIG. 14 is a view illustrating a multi-step height adjuster according to a sixth embodiment of the present disclosure. Referring to FIG. 14, a multi-step height adjuster 1 according to the sixth embodiment of the present disclosure may include a base tube portion 100, a spindle portion 200, an adjustment portion 400, an opening/closing pin portion 500, a controller 600, and a spindle guide portion 900.

Meanwhile, in the multi-step height adjuster 1 according to the sixth embodiment of the present disclosure, the adjustment portion 400 may be formed in a gas spring type and may include a cylinder 410, a piston assembly 420, a spacer 430, a gas sealing member 440, a flange 450, and a cured film 460.

Referring to FIG. 14, the cylinder 410 may be installed in the spindle portion 200 and may have a hollow tube shape. One end portion of the cylinder 410 may be blocked by a cap C, and the cap C may be connected to other external components through a hinge H.

The piston assembly 420 capable of reciprocating may be inserted into the cylinder 410. The piston assembly 420 may include an elongated tubular piston rod 421 and a valve 423. One end portion of the piston assembly 420 may be in contact with an inner surface of the cylinder 410.

Referring to FIG. 14, compressed gas G and oil 0 may be filled under the piston rod 421. Meanwhile, a free piston FP, which partitions a region filled with the compressed gas G and a region filled with the oil 0, may be selectively arranged under the piston assembly 420.

After the piston assembly 420 is inserted, one point of the cylinder 410 may be put inside to determine a top dead point. That is, one point of an inner surface of the cylinder 410 may protrude inward. In this state, when the spacer 430 having a hole in the center is inserted into the cylinder 410, the spacer 430 is hooked on a protruding point of the cylinder 410 to maintain a position thereof.

Meanwhile, the gas sealing member 440 in contact with the spacer 430 may be inserted under the spacer 430. The gas sealing member 440 serves to prevent gas from entering into or exiting from the cylinder 410.

The gas sealing member 440 may also have a ring shape with a hole in the center, and the piston assembly 420 may reciprocate through the hole formed in the gas sealing member 440.

Thereafter, the flange 450 in contact with the gas sealing member 440 may be inserted over the gas sealing member 440. The flange 450 may block an inlet portion of the cylinder 410. After the flange 450 is inserted, a region around the inlet portion of the cylinder 410 may be curled to fit an outer surface shape of the flange 450.

Referring to FIG. 14, the cured film 460 may be arranged between the spacer 430 and the gas sealing member 440. For example, the cured film 460 may be formed by inserting the spacer 430, and then coating a boundary between a lower surface of the spacer 430 and an inner surface of the cylinder 410 with a sealing agent, and then curing the sealing agent.

Referring to FIG. 14, the cured film 460 may be formed to be in contact with an outer circumferential surface of the piston rod 421, and various modifications such as being arranged outside the piston rod 421 with a greater diameter may be performed.

Referring to FIGS. 1, 2, 11, 14, and 15, a cured film 360 may also be formed between the piston rod 310 and the cylinder 350 even when the adjustment portion 400 is a gas cylinder type and may prevent gas from entering into and exiting from the cylinder 350.

The cured film 360 in the gas cylinder type is the same as the cured film 460 in the gas spring type, and thus, redundant description thereof is omitted.

The multi-step height adjuster 1 according to the sixth embodiment of the present disclosure is the same as in the first and second embodiments, except that the adjustment portion 400 is formed in a gas spring type rather than a gas cylinder type, and thus, redundant description thereof is omitted.

Seventh Embodiment

Figure 15:
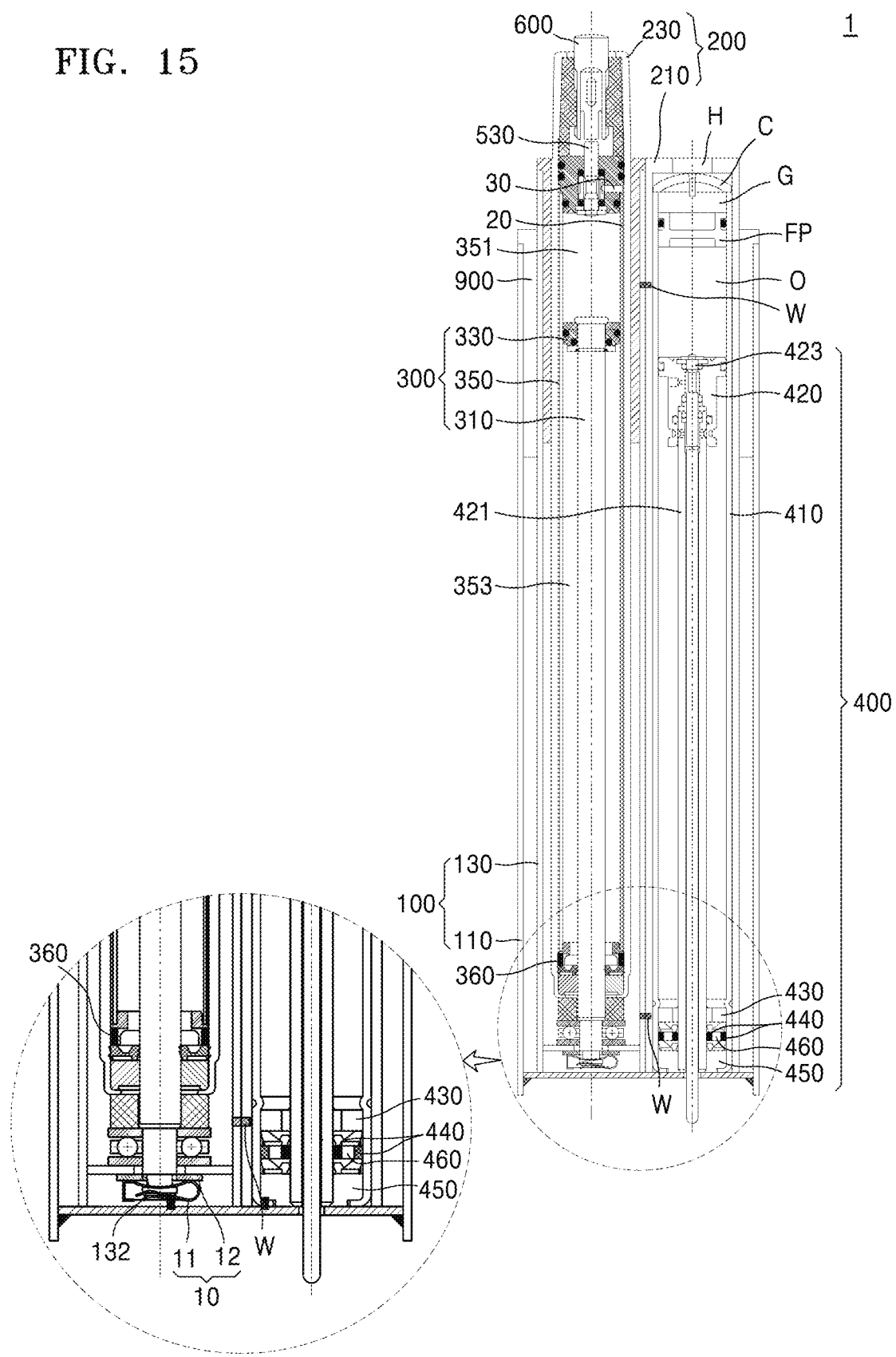
FIG. 15 is a view illustrating a multi-step height adjuster according to a seventh embodiment of the present disclosure.

FIG. 15 is a view illustrating a multi-step height adjuster according to a seventh embodiment of the present disclosure. Referring to FIG. 15, a multi-step height adjuster 1 according to the seventh embodiment of the present disclosure may include a base tube portion 100, a spindle portion 200, an adjustment portion 400, an opening/closing pin portion 500, a controller 600, and a spindle guide portion 900.

Meanwhile, the multi-step height adjuster 1 according to the seventh embodiment of the present disclosure is the same as in the sixth embodiment, except that the piston rod 421 is arranged under the free piston FP (see FIG. 15) unlike the sixth embodiment, and thus, redundant description thereof is omitted.

Eighth Embodiment

Figure 16:
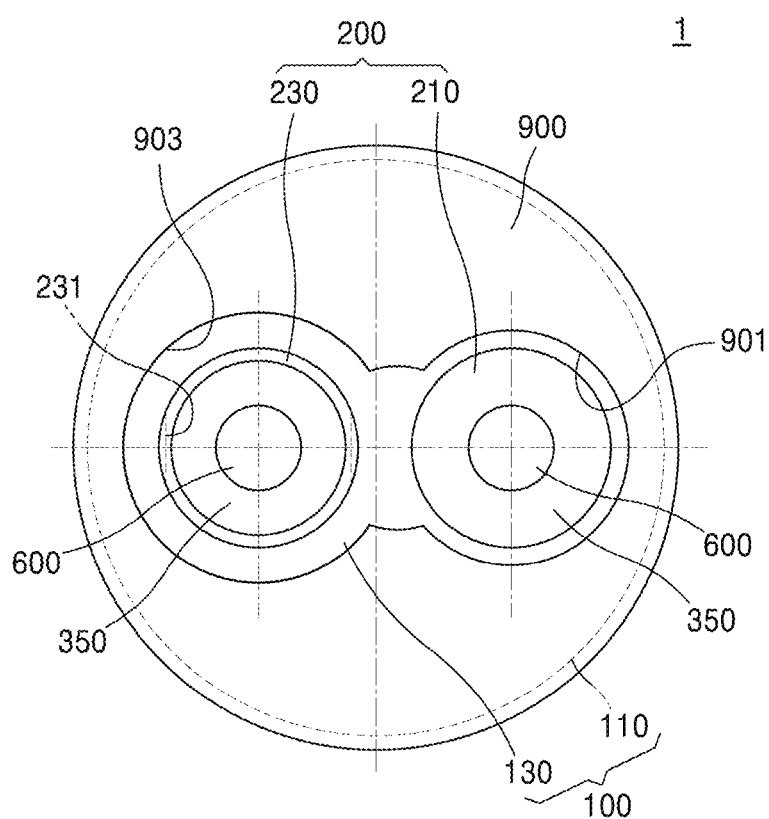
FIG. 16 is a plan view illustrating a multi-step height adjuster according to an eighth embodiment of the present disclosure.
Figure 17:
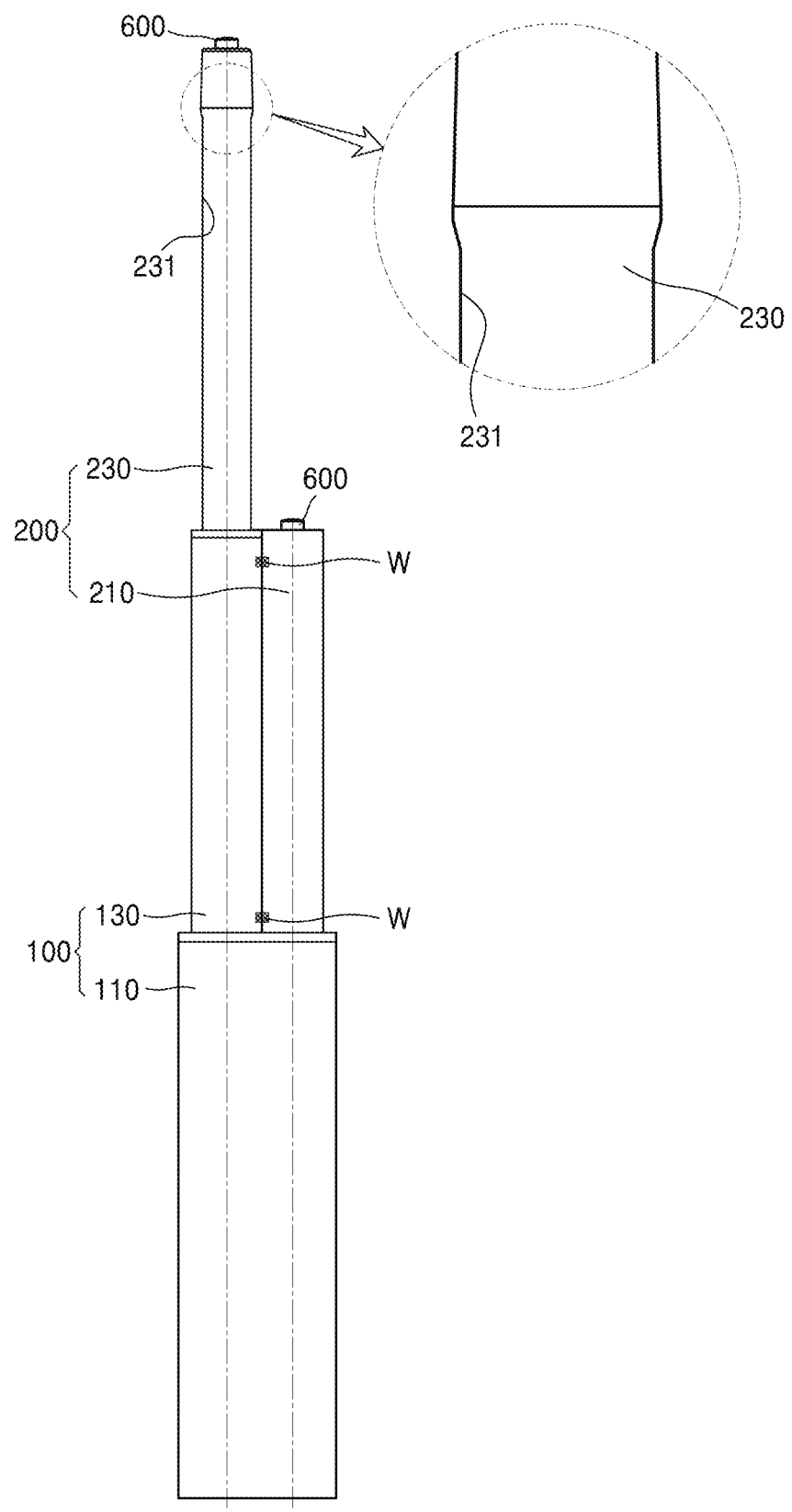
FIG. 17 is a front view schematically illustrating an operation state of the multi-step height adjuster according to the eighth embodiment of the present disclosure.
Figure 18:
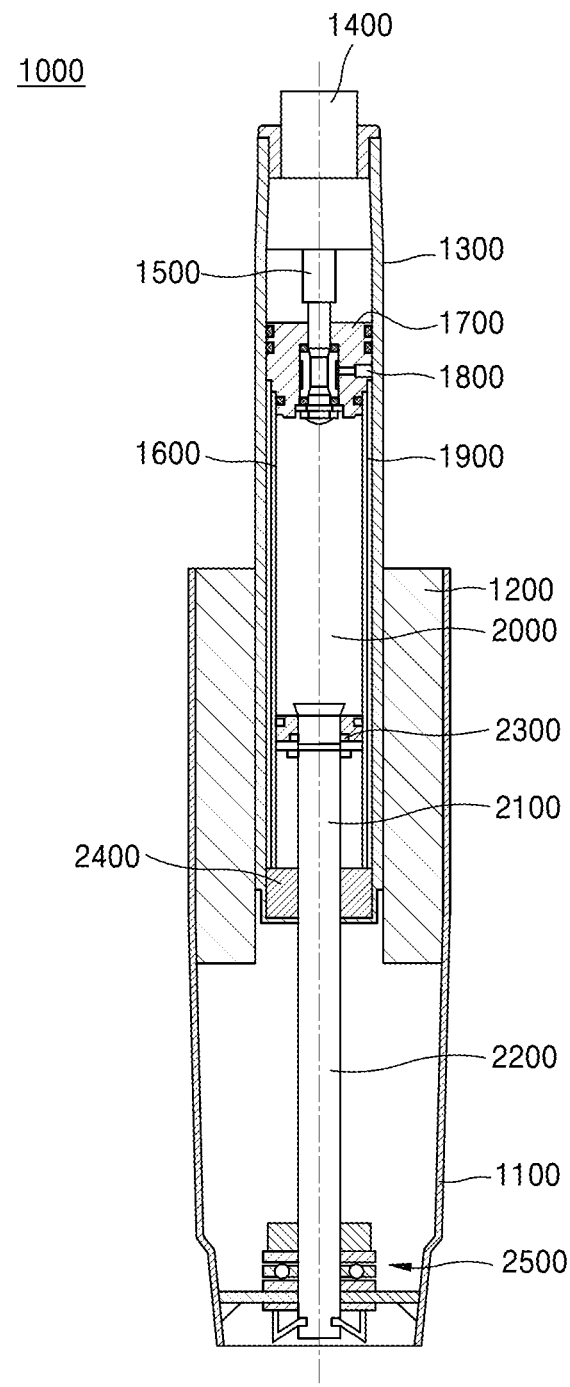
FIG. 18 is a cross-sectional view schematically illustrating a structure of a gas cylinder of the related art.

FIG. 16 is a plan view illustrating a multi-step height adjuster according to an eighth embodiment of the present disclosure. FIG. 17 is a front view schematically illustrating an operation state of the multi-step height adjuster according to the eighth embodiment of the present disclosure.

Referring to FIGS. 16 and 17, a multi-step height adjuster 1 according to the eighth embodiment of the present disclosure may include a base tube portion 100, a spindle portion 200, an adjustment portion 400, an opening/closing pin portion 500, a controller 600, and a spindle guide portion 900.

Referring to FIGS. 16 and 17, one side of the spindle portion 200 according to the eighth embodiment of the present disclosure may be cut to form a cut surface 231.

Specifically, the spindle portion 200 may have a relatively short distance from the center in a predetermined section in a circumferential direction thereof, and the cut surface 231 may be formed flat in the longitudinal direction of the spindle portion 200, that is, the second spindle 230.

The cut surface 231 may be formed in a predetermined section in a length direction of the second spindle 230. Due to this, the cut surface 231 is not formed on an upper side (see FIG. 17) of the second spindle 230 and is coupled to correspond to an inner shape of a mounting portion (not illustrated), and thus, a coupling force between the mounting portion and the second spindle 230 may be increased.

As the cut surface 231 is formed in the longitudinal direction of the second spindle 230, an inner surface of the second base tube 130 facing the second spindle 230 may have a protruding surface (not illustrated) formed in a direction toward the cut surface 231.

Accordingly, there is an effect of preventing the second spindle 230 from rotating inside the second base tube 130.

In FIGS. 16 and 17, one side of the second spindle 230 is cut to form the cut surface 231, but the present disclosure is not limited thereto, and one side of the first spindle 210 may be cut to form a cut surface, and an inner surface of the base tube 110 may have a protruding surface (not illustrated) formed in a direction toward the cut surface, and various modifications may be made.

Meanwhile, the multi-step height adjuster 1 according to the eighth embodiment of the present disclosure is the same as in the first embodiment, except that the cut surface 231 is formed in the spindle portion 200, specifically, at least one of the first spindle 210 and the second spindle 230, and thus, redundant description thereof is omitted.

Referring to the first to eighth embodiments of the present disclosure, an adjustment portion according to one embodiment of the present disclosure may include a gas cylinder, a gas spring, and a hydraulic cylinder (not illustrated), and a spindle portion, specifically, a first spindle and a second spindle may be formed in any one of a gas cylinder type, a gas spring type, and a hydraulic cylinder type.

In addition, it goes without saying that various modifications, such as arranging a controller installed in the first spindle above or below the center of the first spindle, may be made.

The specific implementations described in the present disclosure are examples and do not limit the scope of the present disclosure in any way. For the sake of brief specification, description on electronic configurations, control systems, software, and other functional aspects of the systems of the related art may be omitted. In addition, connections or connection members of lines between components illustrated in the drawings exemplarily represent functional connections and/or physical connections or circuit connections, and in an actual device, various functional connections, physical connections, or circuit connections that may be replaced or added may be represented. In addition, if there is no specific description such as "essential" or "important", the component may not be an essential component for application of the present disclosure.

Accordingly, the idea of the present disclosure is limited to the above-described embodiments, and not only the claims to be described below, but also all scopes equivalent to or equivalently changed from the claims are within the scope of the idea of the present disclosure.

INDUSTRIAL APPLICABILITY

The present disclosure provides a multi-step height adjuster. In addition, embodiments of the present disclosure may be applied to a table, a work stand, a dining table, or a desk or seat that may be adjusted in height, which are used for an industry. In addition, the embodiments of the present disclosure may be applied to a medical apparatus and a cart which are adjustable in height.

The invention claimed is:

1. A multi-step height adjuster comprising:
    a base tube portion including a first base tube and a second base tube vertically reciprocating inside the first base tube;
    a spindle portion including a first spindle installed inside the first base tube to vertically reciprocate and a second spindle installed inside the second base tube to vertically reciprocate;
    an opening/closing pin system coupled to the first spindle and the second spindle;
    a controller system configured to actuate the opening/closing pin system to control movement of the first spindle and the second spindle; and
    an adjustment portion installed in the spindle portion to transmit power to the spindle portion,
    wherein the first spindle and the second base tube are integrally moved.

2. The multi-step height adjuster of claim 1, wherein an outer shape of the first base tube is one of a circular shape, a polygonal shape, and a streamlined shape.

3. The multi-step height adjuster of claim 1, wherein the spindle portion is formed in one of a circular shape, a polygonal shape, and a streamlined shape.

4. The multi-step height adjuster of claim 1, wherein one side of the spindle portion is cut to form a cut surface.

5. The multi-step height adjuster of claim 1, wherein an outer circumferential surface of the first spindle and an outer circumferential surface of the second base tube are coupled to each other by welding.

6. The multi-step height adjuster of claim 1, wherein the adjustment portion installed in the spindle portion is any one of a gas cylinder or a gas spring.

7. The multi-step height adjuster of claim 6, wherein the gas cylinder comprises:
    a piston rod inserted into the base tube portion;
    a piston assembly coupled to the piston rod to relatively move inside the spindle portion; and
    a cylinder inserted into the spindle portion to be in surface-contact with the piston assembly.

8. The multi-step height adjuster of claim 6, wherein the gas spring comprises:
    a hollow cylinder installed in the spindle portion;
    a piston assembly vertically reciprocating inside the cylinder;
    a spacer arranged inside the cylinder to limit movement of the piston assembly;
    a gas sealing member arranged inside the cylinder to be in contact with the spacer;
    a flange in contact with the gas sealing member to block an inlet portion of the cylinder; and
    a cured film arranged between the spacer and the gas sealing member or between the gas sealing member and the flange to cure a liquid sealing agent to close a gas outflow path.

9. The multi-step height adjuster of claim 1, further comprising:
    the opening/closing pin system including a first opening/closing pin coupled to one of the first spindle and the first base tube to open and close a gas flow path into the first spindle, and a second opening/closing pin coupled to the second spindle to open and close a gas flow path into the second spindle; and the controller system including a first controller for controlling movement of the first opening/closing pin portion and a second controller for controlling movement of the second opening/closing pin portion.

10. The multi-step height adjuster of claim 9, wherein the controller system comprises:
a release arm arranged to be in contact with one end portion of the opening/closing pin system to control opening and closing of the opening/closing pin system; and
a tapered holder configured to accommodate the release arm and arranged inside the spindle portion and in contact with the release arm to support the release arm.

11. The multi-step height adjuster of claim 10, further comprising:
a rotation guide member arranged between the tapered holder and the spindle portion to guide rotation of the release arm so that the release arm is rotatable about a longitudinal central axis of the opening/closing pin system.

12. The multi-step height adjuster of claim 9, wherein the controller system comprises:
a stick portion connected to one end portion of the opening/closing pin system and rotatably arranged at the center of the spindle portion to control opening and closing of the opening/closing pin system; and
a tapered holder configured to accommodate the stick portion and arranged inside the spindle portion.

13. The multi-step height adjuster of claim 1, further comprising:
a spindle guide portion inserted into the first base tube to be coupled to the first base tube and arranged outside the first spindle and the second base tube to guide elevation paths of the first spindle and the second base tube.

* * * * *